(12) United States Patent
Reid et al.

(10) Patent No.: US 10,241,293 B2
(45) Date of Patent: Mar. 26, 2019

(54) METHODS AND APPARATUS FOR DEPLOYABLE SPARSE-APERTURE TELESCOPES

(71) Applicant: Massachusetts Institute of Technology, Cambridge, MA (US)

(72) Inventors: Bryan M. Reid, Chelmsford, MA (US); Mark Silver, Bedford, MA (US); Robert Martinez, Providence, RI (US); Alan Decew, West Newton, MA (US); Adam Shabshelowitz, Cambridge, MA (US); Michael Chrisp, Burlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 667 days.

(21) Appl. No.: 14/865,646

(22) Filed: Sep. 25, 2015

(65) Prior Publication Data
US 2018/0106981 A1   Apr. 19, 2018

Related U.S. Application Data

(60) Provisional application No. 62/055,838, filed on Sep. 26, 2014.

(51) Int. Cl.
*B64G 1/66*   (2006.01)
*G02B 17/08*  (2006.01)
(Continued)

(52) U.S. Cl.
CPC ............... *G02B 7/183* (2013.01); *B64G 1/66* (2013.01); *G02B 7/1827* (2013.01); *G02B 17/0808* (2013.01); *G02B 23/16* (2013.01)

(58) Field of Classification Search
CPC ........ B64G 1/222; G02B 23/06; G02B 23/20; G02B 23/02; G02B 23/2476; G02B 17/061; G02B 27/1066
(Continued)

(56) References Cited

U.S. PATENT DOCUMENTS 3,735,943 A * 5/1973 Fayet .................... B64G 1/222
                                                      244/172.7
5,753,324 A    5/1998 Aoyagi et al.
(Continued)

OTHER PUBLICATIONS

Boston Micromachines Corporation, "The Wavefront Sensorless Adaptive Optics Demonstrator System Description and Concept Introduction", WS AOD Technical Whitepaper, May 2012, 9 pages.
(Continued)

*Primary Examiner* — Collin X Beatty
(74) *Attorney, Agent, or Firm* — Smith Baluch LLP

(57) ABSTRACT

An imaging system includes a metering structure and a plurality of foldable members disposed around a periphery of the metering structure. Each foldable member in the plurality of foldable members includes an arm comprising a strain deployable composite and a reflector disposed on the arm. The arm in a respective foldable member in the plurality of foldable members is configured to hold the respective foldable member toward the metering structure in a first state and to hold the respective foldable member away from the metering structure in a second state such that the reflector of the respective foldable member forms part of a sparse aperture in the second state.

25 Claims, 18 Drawing Sheets

(51) Int. Cl.
  *G02B 23/16* (2006.01)
  *G02B 7/182* (2006.01)
  *G02B 7/183* (2006.01)

(58) Field of Classification Search
  USPC .................. 359/855, 399, 406, 408, 419
  See application file for complete search history.

(56) References Cited

U.S. PATENT DOCUMENTS

| | | | |
|---|---|---|---|
| 5,905,591 | A | 5/1999 | Duncan et al. |
| 6,880,943 | B2 | 4/2005 | Fiete et al. |
| 6,943,946 | B2 | 9/2005 | Fiete et al. |
| 7,782,530 | B1 | 8/2010 | Krumel et al. |
| 8,683,755 | B1 * | 4/2014 | Spence .............. B64G 1/222 |
| | | | 136/245 |
| 2003/0227696 | A1 | 12/2003 | Maker |
| 2010/0202073 | A1 | 8/2010 | Cook |
| 2011/0001086 | A1 | 1/2011 | Kruckenberg |
| 2013/0229709 | A1 | 9/2013 | Newswander et al. |

OTHER PUBLICATIONS

Chung, S. J., "Design, Implementation and Control of a Sparse Aperture Imaging Satellite", Master of Science at Massachusetts Institute of Technology, Department of Aeronautics and Astronautics, Sep. 2002, 238 pages.

Chung, S. J. et al., "Design and Implementation of Sparse Aperture Imaging Systems", Highly Innovative Space Telescope Concepts, Proceedings of SPIE vol. 4849, (2002), pp. 181-192.

Chung, S. J. et al., "Design, Implementation and Operation of a Sparse Aperture Imaging System Testbed", 16$^{th}$ Annual/USU Conference on Small Satellites, SSC02-III-5, (2002), 16 pages.

Lillie, C. F., "Large Deployable Telescopes for Future Space Observatories", UV/Optical/IR Space Telescopes: Innovative Technologies and Concepts II, Proceedings of SPIE vol. 5899, (Aug. 31, 2005), 12 pages.

Vorontsov, M. A. et al., "Stochastic parallel-gradient-descent technique for high-resolution wave-front phase-distortion correction", Optical Society of America, vol. 15, No. 10, (1998), pp. 2745-2758.

Wu, Q. et al. "Image Recovering for Sparse-aperture Systems", Information Optics and Photonics Technology, Proceedings of SPIE vol. 5642, (2005), pp. 478-486.

Xiong, C. et al., "Dynamic Experimental Study of Deployable Composite Structure," Appl Compos Mater, vol. 18, (2011), pp. 439-448.

Notification of Transmittal of the International Search Report and the Written Opinion of the International Searching Authority for related PCT Application No. PCT/US2015/052256, filed Sep. 25, 2015, dated Dec. 17, 2015, 15 pages.

* cited by examiner

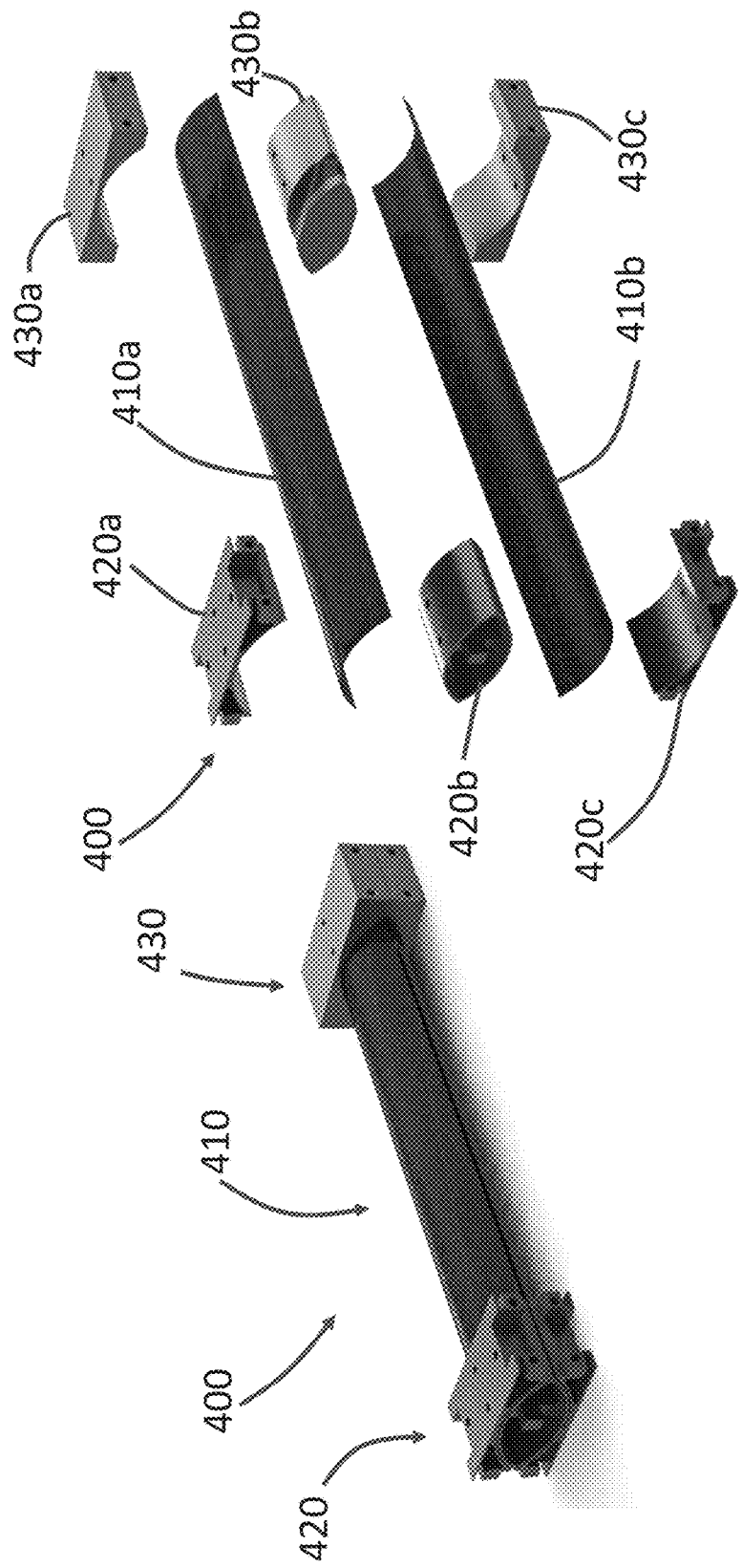

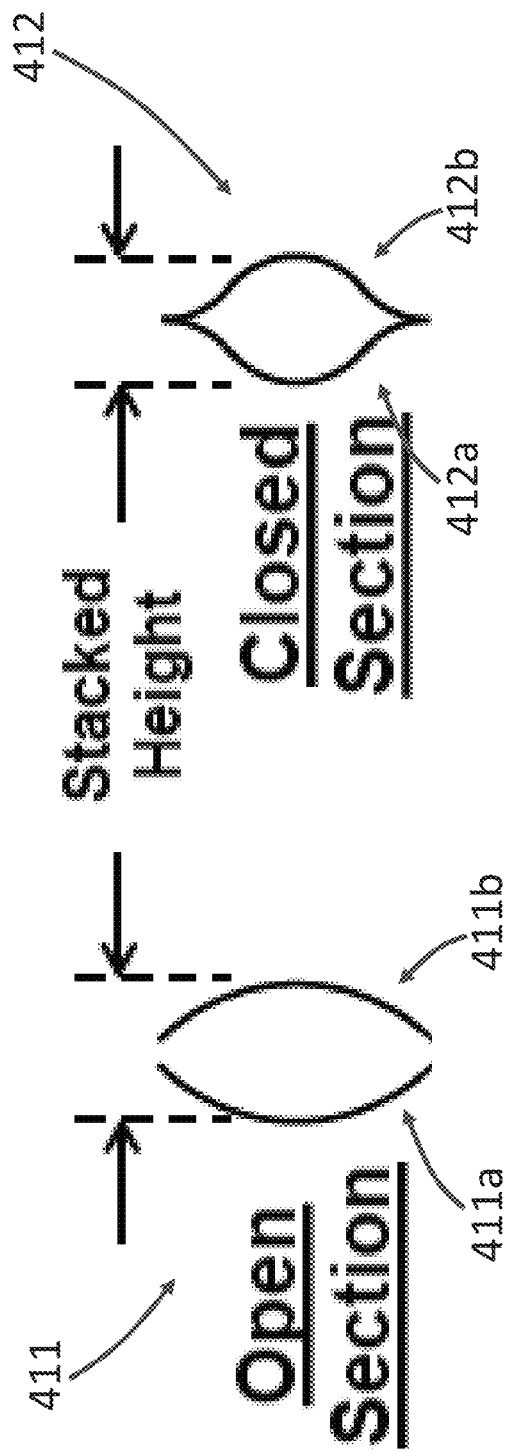

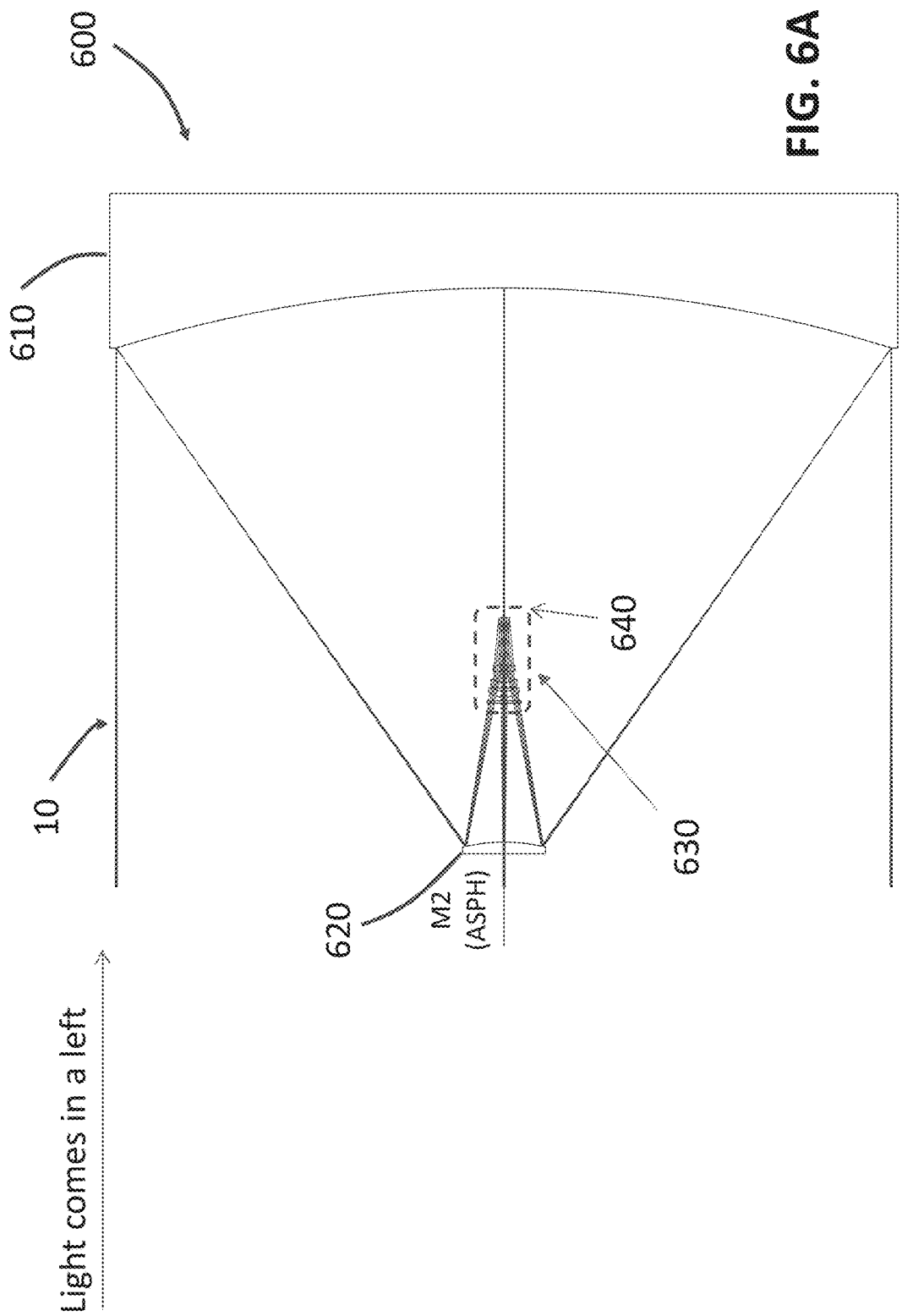

METHODS AND APPARATUS FOR DEPLOYABLE SPARSE-APERTURE TELESCOPES

CROSS-REFERENCES TO RELATED APPLICATIONS

This application claims priority to U.S. provisional application Ser. No. 62/055,838, filed Sep. 26, 2014, entitled "METHOD AND APPARATUS FOR DEPLOYABLE SPARSE-APERTURE TELESCOPE IN SMALL SATELLITE FORM-FACTOR," which is hereby incorporated herein by reference in its entirety.

GOVERNMENT SUPPORT

This invention was made with Government support under Contract No. FA8721-05-C-0002 awarded by the U.S. Air Force. The Government has certain rights in the invention.

BACKGROUND

The resolution of imaging systems (e.g., telescopes) is typically proportional to the aperture size (also referred to as light collecting area) of the systems. Conventionally, a larger aperture size can be achieved by using lenses or mirrors of a larger diameter. For example, the Hubble Space Telescope has a single aperture (filled with monolithic lenses) with a diameter on the order of about 2.4 meters. A telescope of this size almost completely fills a space shuttle cargo bay. Therefore, the aperture diameter of the Hubble Space Telescope is already the maximal diameter a space-based telescope can practically have. Accordingly, the resolution of a single aperture space imaging system is already at its practical limit.

Increasing the diameter of monolithic lenses or mirrors may introduce at least two challenges. First of all, the cost and technical difficulty to manufacture a lens increases significantly as the diameter of the lens increases due to, for example, the stringent requirements on the surface quality of the lens. In addition, lenses of larger diameter are normally heavier, thereby requiring stiff support structures. Normally, the entire telescope support structure and the lens are steered in order to aim the lens at the desired field of view. Sufficient stiffness of the rigid telescope support structure is desired such that reaction forces on the support structure during positioning do not adversely affect the sensitive image collecting optics of the telescope. Stiffness typically translates into added weight and cost, which can be primary constraint factors in space applications.

An alternative to imaging systems using monolithic lenses is to fabricate lenses (or reflectors) as a number of segmented and foldable components. This option can reduce fabrication costs and weight and can package large lenses or mirrors into the cargo bays of existing space launch vehicles. Therefore, it is conceivable to build a multi-meter diameter segmented full aperture imaging system (i.e., the aperture is filled up with lenses or mirrors), which can gather more light and have a higher resolution than that of the Hubble Space Telescope.

However, in space applications, a multi-meter diameter segmented full aperture system is compactly stowed within the cargo space of a launch vehicle in order to be sent into its orbit. Stiff foldable support structures are normally employed for the stowing. Sometimes thin deformable mirrors are used to save weight, in which case complex and potentially high bandwidth adaptive optics are also included in the imaging system for positioning the deformable mirrors. Sometimes the imaging system may also be implemented as a phased array (either on the same satellite or a separate satellite), which then typically also includes complex piston and pupil matching control. Therefore, a multi-meter diameter segmented full aperture imaging system could still be heavy and have high technical risk.

Another alternative to imaging systems using monolithic lenses is to use sparse apertures (also referred to as dilute apertures, sparse arrays, sparse aperture array, or sparse distributed apertures). In a sparse aperture, a number of sub-apertures (e.g., lenses or mirrors) are sparsely distributed within an aperture area (i.e., the aperture area is only partially filled with lenses or mirrors) to synthesize the performance of, for example, a monolithic lens (or any other imaging optics) filling the entire aperture area.

SUMMARY

Embodiments of the present invention include apparatus, systems, and methods of imaging a scene using sparse apertures. In one example, an imaging system includes a metering structure and a plurality of foldable members disposed around a periphery of the metering structure. Each foldable member in the plurality of foldable members includes an arm comprising a strain deployable composite and a reflector disposed on the arm. The arm in a respective foldable member in the plurality of foldable members is configured to hold the respective foldable member toward the metering structure in a first state and to hold the respective foldable member away from the metering structure in a second state such that the reflector of the respective foldable member forms part of a sparse aperture in the second state.

In another example, a method of deploying an imaging system is disclosed. The imaging system comprises a plurality of foldable members disposed around a periphery of a metering structure. Each foldable member in the plurality of foldable members comprises a reflector disposed on an arm comprising a strain deployable composite. The method of deploying the imaging system includes A) stowing the plurality of foldable members so as to strain the strain deployable composite and B) releasing the strain on the strain deployable composite so as to deploy reflectors in the plurality of foldable members to form a sparse aperture.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 4A-4B show the perspective view and exploded view of an arm assembly that can be used in imaging systems shown in FIG. 2.

FIGS. 4C-4D illustrate different configurations of arms that can be used in the arm assembly shown in FIGS. 4A-4B.

FIGS. 6A-6B show schematic views of an optical design that can be used in the imaging systems shown in FIG. 2.

DETAILED DESCRIPTION

Figure 1:
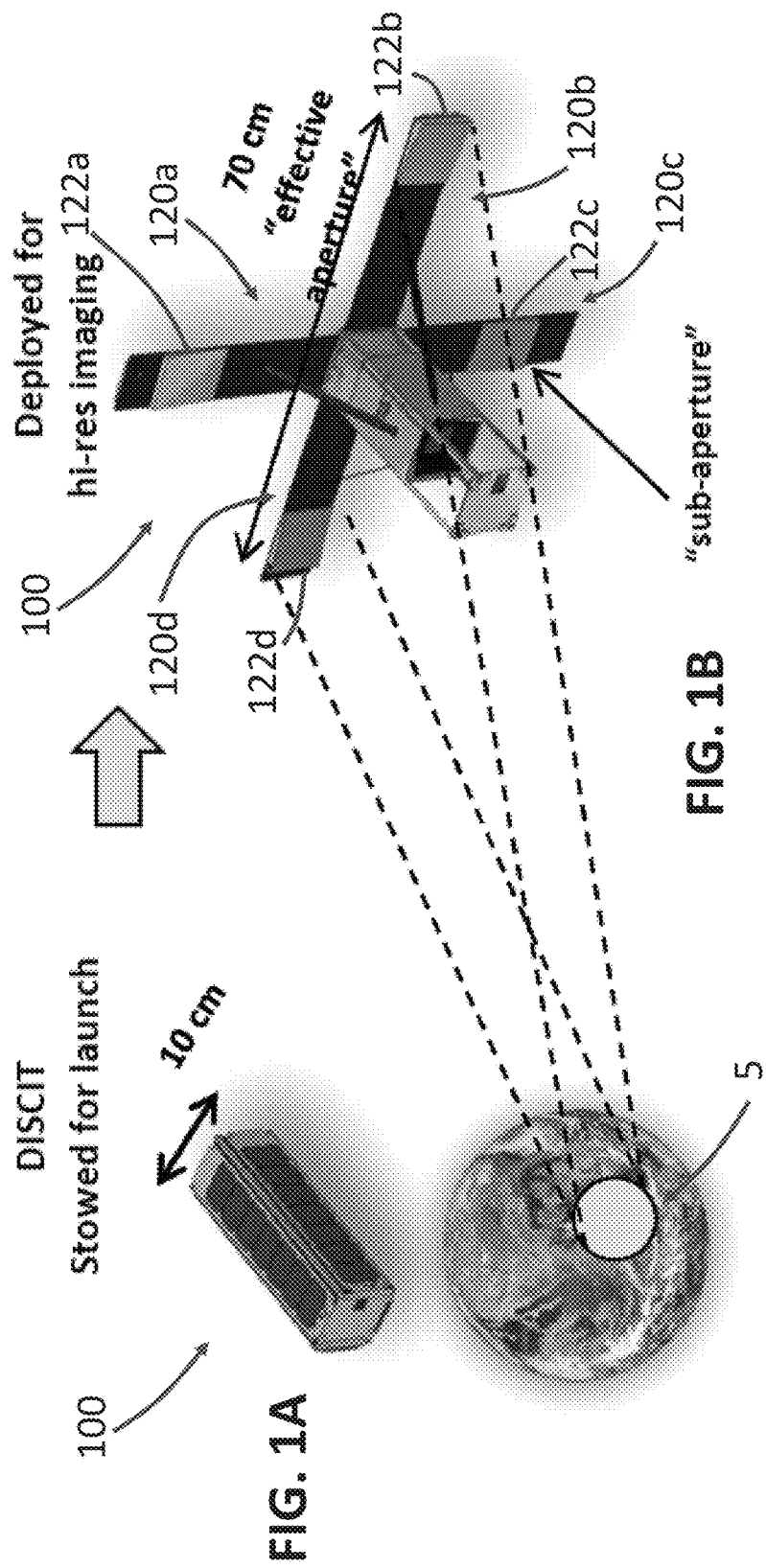
FIGS. 1A-1B illustrate a general architecture of a space-based application of sparse apertures.

Sparse apertures can be used in either earth-based applications or space-based applications. FIGS. 1A and 1B illustrate a general architecture of a space telescope using sparse apertures. FIG. 1A shows a space telescope 100 in a stowed state, which can be used, for example, during the launching of the space telescope 100 into its orbit in space or during other transportations of the space telescope 100. FIG. 1B shows the space telescope 100 in a deployed state, in which four petal segments 120a, 120b, 120c, and 120d (collectively referred to as petal segments 120) of the telescope 100 are unfolded. Each petal segment 120a to 120d has a respective mirror (also referred as a sub-aperture) 122a to 122d (collectively referred to as mirrors 122). In the deployed state, the four mirrors 122 form a sparse aperture to image a field of interest 5 on earth. Although each mirror 122a to 122d in a sparse aperture can be small, the resulting sparse aperture can be much larger than each individual mirror and the total area of the individual mirrors as well. For example, the mirrors 122 shown in FIGS. 1A-1B can have a square shape with a length of about 10 cm to fit a standard cubesat (a type of miniaturized satellite for space research in space applications). The resulting sparse aperture can have a diameter as large as 70 cm, depending on the length of each petal segment. In other words, the four mirrors 122, each of which is 10 cm×10 cm, can collectively achieve nearly the performance of, for example, a monolithic lens having a diameter of 70 cm when the mirrors 122 are disposed in a sparse aperture architecture.

Individual sub-apertures in a sparse aperture form a larger, although non-continuous, virtual collecting surface, which normally has a focusing shape such as a hyperboloid, a paraboloid, a sphere, or any other shape known in the art. Put differently, when deployed, each sparse aperture forms a portion of the virtual collecting surface, which may be part of a hyperboloid, paraboloid, sphere, ellipsoid, or other suitable surface. Light captured by each individual sub-aperture can be coherently combined together to generate a high resolution image.

To achieve coherent phased beam combining, beams from individual sub-apertures are typically superimposed on a CCD or a CMOS (or generally a focal plane) with an accuracy of a fraction of the operating wavelengths. Stated differently, individual sub-apertures are disposed within a fraction of the operating wavelengths from the desired virtual collecting surface. Therefore, conventional sparse apertures also include complex wavefront sensors to measure the wavefront of the beams from individual sub-apertures and make corrections if necessary. These wavefront sensors can be heavy, expensive, and bulky, thereby limiting the widespread use of sparse apertures in space applications.

In addition, since the petal segments (e.g., 120a to 120d shown in FIGS. 1A-1B) are folded during launching and unfolded when the telescope using sparse apertures is in normal operation, normally some robust but heavy mechanical connectors are employed to carry out the folding and unfolding. These connectors further increase the total size, weight, and power (SWaP) of the telescope system.

Imaging Systems Including Sparse Apertures Using Deployable Strain Composite

Figure 2:
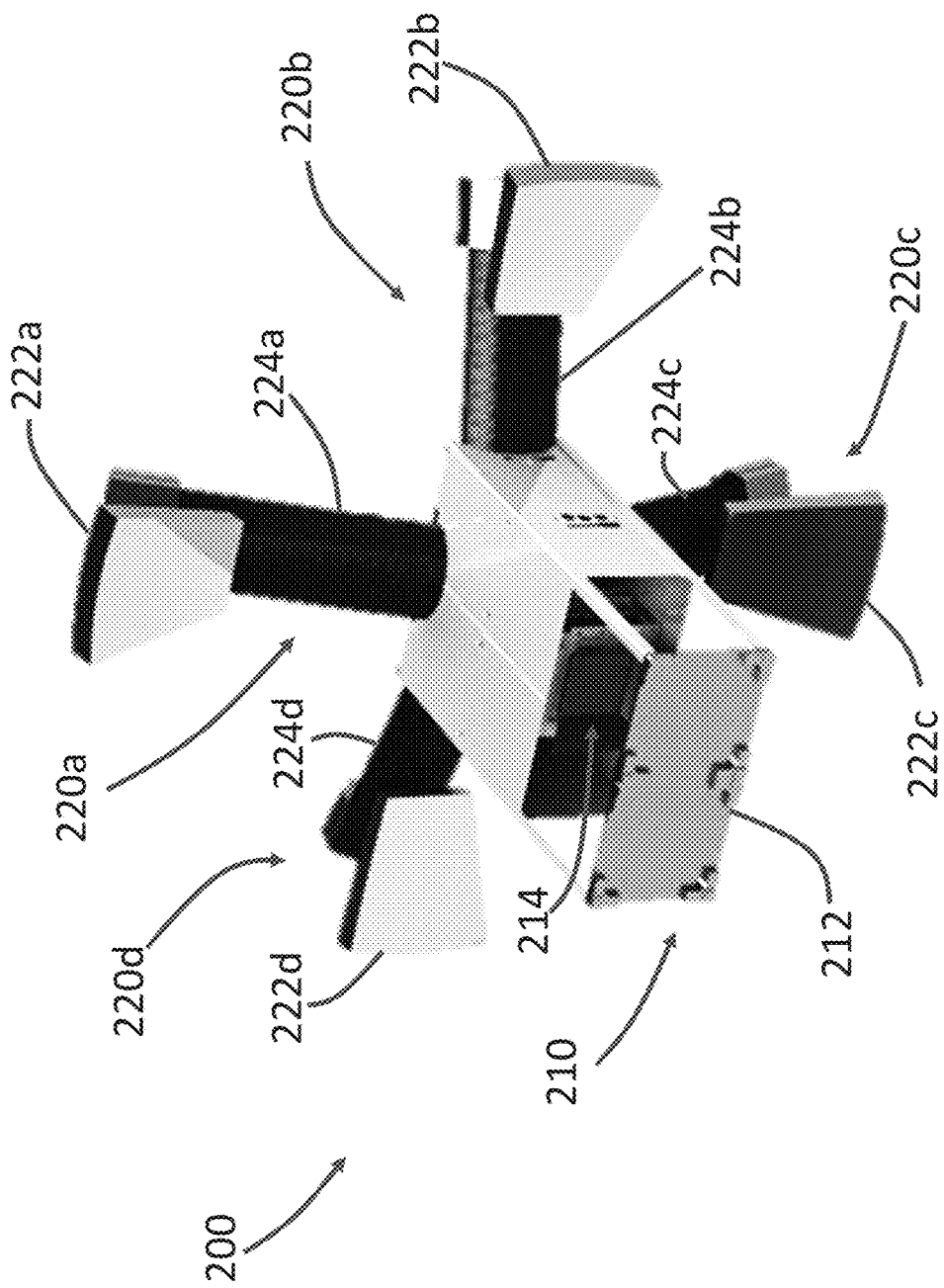
FIG. 2 shows a schematic of an imaging system including a sparse aperture using strain deployable composite arms.

FIG. 2 shows a schematic of an imaging system that can address, at least partially, the challenges in conventional sparse apertures described immediately above. The imaging system 200 includes a metering structure 210 and a plurality of foldable members 220a, 220b, 220c, and 220d (collectively referred to as foldable members 220, deployable optic supports, or foldable optic supports) disposed around a periphery of the metering structure 210. Each foldable member 220a to 220d further includes a respective arm 224a to 224d (collectively referred to as arms 224, also referred to as hinges or petals) and a respective reflector 222a to 222d (collectively referred to as reflectors 222). The arms 224 comprises a strain deployable composite such that each arm 224a to 224d holds the respective foldable member 220a to 220d toward the metering structure 210 in a first state (stowed state). Each arm 224a to 224d further holds the respective foldable member 210a to 210d away from the metering structure 210 in a second state (deployed state) such that the reflector 222a to 222d of the respective foldable member 220a to 220d forms part of a sparse aperture in the second state.

The imaging system 200 can be aligned on Earth (e.g., in a laboratory) with the foldable members 210 in the deployed state. Then the foldable members 210 can be stowed by bending the arms 224 toward the metering structure 210 in order to launch the imaging system 200 into the desired orbit in space. When the imaging system 200 is in space, the strain energy stored in the strain deployable composite constituting the arms 224 can be released, thereby unfolding the foldable members 220 back into the deployed state, which was aligned on earth. The arms 224 can be coupled to the metering structure 210 via direct bonding or some simple connecting pieces, thereby eliminating the need of heavy and bulky mechanical connectors as normally included in conventional sparse aperture systems. In addition, since the reflectors 222 can form a sparse aperture based on the release of strain energy in the strain deployable composite, the imaging system 200 can be automatically aligned and can operate without the complex wavefront sensors.

The metering structure 210 shown in FIG. 2 has a rectangular cross section for illustrating purposes only. In practice, the metering structure can have various cross sections depending on, for example, the number of foldable members 220 included in the imaging system 200 or the shape of the launching vehicles that convey the imaging system 200 into orbit.

In one example, the imaging system 200 includes only two foldable members 220 and the metering structure 210 can have a square or rectangular cross section. In another example, the imaging system 200 includes four foldable members 220 as shown in FIG. 2 and the metering structure 210 can also be either square or rectangular. In yet another example, the imaging system 200 includes five foldable members 220 (also referred to as five-petal systems) and the cross section of the metering structure 210 can be a pentagon. In yet another example, the imaging system 200 includes six foldable members 220 (also referred to as six-petal systems) and accordingly the metering structure 210 can have a hexagonal cross section. In yet another example, the number of sides in the cross section of the metering structure 210 can be greater than the number of foldable members 220. More specifically, the metering structure 210 can be square or rectangular (having 4 sides) but the number of foldable members can be less than 4 (e.g., two or three).

The metering structure 210 can further include a secondary optic 212 and a detecting system 214. The secondary optic 212 can receive beams reflected from each individual sub-aperture 222 and reflect the received beams toward the detecting system 214 to form one or more images. The secondary optic 212 can reduce spherical aberrations of the beams collected by the sparse aperture. In one example, the secondary optic 212 can include an aspheric reflector, which is typically light weight and do not introduce chromatic aberrations. In another example, the secondary optic 212 has a hyperbolic surface with high-order aspherics. In some examples, the secondary optic 212 can have an aspheric surface in concert with the aspheric surface of the sparse aperture (more specifically the individual reflectors 222) to correct spherical aberrations.

The detecting system 214 in the metering structure 210 can include a detector and associated electronics, such as a charged coupled device (CCD), a complementary metal-oxide semiconductor (CMOS), or any other type of detector known in the art. The detecting system 214 can also include one or more processors (not shown in FIG. 2) that can implement various alignment methods to dispose each individual reflector 222a to 222d at a desired position and orientation.

The reflectors 222 can have various shapes, such as square, rectangular, trapezoid, or round. In one example, all the reflectors 222a to 222d have the same surface shape. In another example, one reflector (e.g., 222a) can have a different surface shape from that of another reflector (e.g., 222b). The reflectors 222 can also have various surface curvatures, such as hyperboloid, parabola, or sphere. In general, each reflector 222 can be regarded as a segment carved out from the virtual surface of the desired sparse aperture. Therefore, if the sparse aperture has a hyperboloid shape, then each reflector 222a to 222d can be a portion of a hyperboloid. Similarly, if the sparse aperture has a parabola shape, then each reflector 222a to 222d can be a portion of parabola.

The total area of the reflector 222a to 222d is typically smaller than the area of the resulting sparse aperture formed by the collection of reflectors 222. The boundary of the sparse aperture can be marked by straight lines connecting the four reflectors 222 shown in FIG. 2, in which case the sparse aperture can have a square shape. The boundary of the sparse aperture may also be defined by a circle passing through the four reflectors 222, in which case the sparse aperture can have a round shape. In some examples, the imaging system shown in FIG. 2 has a 70 cm outer diameter and 35 cm total length. Each reflector 222a to 222d can be approximately 10 cm×15 cm. The arm can be approximately 20 cm long in one direction and 15 cm long in the other. The total weight can be between about 7 kg and about 10 kg.

The ratio of the total area of the reflectors 222 to the area of the resulting sparse aperture is conventionally defined as the fill factor of the sparse aperture. The fill factor of the imaging system 200 can be greater than 10%, greater than 20%, greater than 30%, greater than 40%, or greater than 50%. Increasing the fill factor can increase the number of photons that can be collected by the sparse aperture within a given integration time. However, larger fill factors may also indicate a greater total weight of the reflectors 222. In practice, the fill factor can depend, for example, on a trade-off between these two considerations.

The reflectors 222 can also comprise various materials that can reflect radiation at various wavelengths so as to allow the imaging system to operate at various wavelengths. In one example, the reflectors 222 can include metallic or dielectric mirrors operating at visible and near infrared region. In another example, the reflectors 222 can include parabolic antenna reflectors operating in the radio frequency region. In yet another example, the reflectors 222 can include multilayer structures of alternating high and low refractive indices so as to have a narrow-band reflection at or near a particular wavelength.

The arms 224 in the imaging system 200 comprise a strain deployable composite, which can store a large amount of strain energy when the arms 224 are folded and release the stored strain energy at the moment when the arms 224 are unfolded so as to configure the imaging system 200 into an operating mode. In one example, the strain deployable composite includes fiberglass. In another example, the strain deployable composite includes carbon fiber composites. In yet another example, the strain deployable composite comprises a carbon fiber reinforced plastic (CFRP). In yet another example, the strain deployable composite comprises deployable carbon/epoxy or glass/epoxy thin-walled composite shell structures.

In some examples, the entire arm 224 can be made of the strain deployable composite. In operation, the arms 224 can be bent at any point when stowed for launching into the space. For example, the arms 224 can be bent close to the interface between the arms 224 and the metering structure 210. In this case, the stowed imaging system 200 can have a compact size. In another example, the arms 224 can be bent close to the middle of the arms 224. In this case, the stowed imaging system 200 may fit certain specific space constraints. It may also take less strain energy to unfold the arms 224 back to the deployed state when the arms 224 are bent close to the middle, compared to situations in which the arms 224 are bent at the end. In yet another example, when stowing the foldable members 220, the arms 224 can be bent away from the metering structure 210. In this case, the reflectors 222 can be far away from the metering structure 210 in stowed state (and in deployed state as well), thereby eliminating potential damages to the reflectors 222 during launch.

The arms 224 can be configured (e.g., using particular physical structures as shown in FIGS. 4A-4B) to dispose the reflectors 222 within 5 μm (or within 2 μm, or within 1 μm, or within 0.5 μm) of a desired position within the sparse aperture. In general, a sparse aperture can acquire satisfactory images when each individual sub-aperture is disposed within a fraction of the operation wavelength (e.g., $\lambda/2$, $\lambda/4$, $\lambda/10$, or $\lambda/20$) of the imaging system. If the imaging system 200 is operating within radio frequency range ($\lambda$>100 µm), the arms 224 can readily unfold the reflectors 222 to locations that are sufficiently accurate for imaging. In another example, the imaging system 200 may operate within the visible region of the electromagnetic spectrum ($\lambda$~390 nm to 700 nm). In this case, the arms 224 can be configured accordingly (e.g., using thicker or shorter arms) to improve the absolute precision when unfolding. Alternatively or additionally, some active alignment elements, such as piezo-actuators, can be employed to align the reflectors 222 (see, e.g., FIGS. 3A-3C below).

The length of the arms 224 can depend on, for example, the overall dimension of the resulting sparse aperture. In one example, the length of the arms 224 is at least ¼ of the diameter of the resulting sparse aperture. In another example, the length of the arms 224 is at least ⅓ of the diameter of the resulting sparse aperture. In yet another example, the length of the arms 224 is at least ½ of the diameter of the resulting sparse aperture. Different arms in the imaging system 200 may have different lengths. For example, arm 224a may have a different length from that of arm 224b. In another example, the pair of arms opposite each other (e.g., 222a and 222c) can have a first length while the other pair (e.g., 222b and 222d) can have a second length different from the first length.

Foldable Members Including Piezoelectric Actuators

Figure 3A:
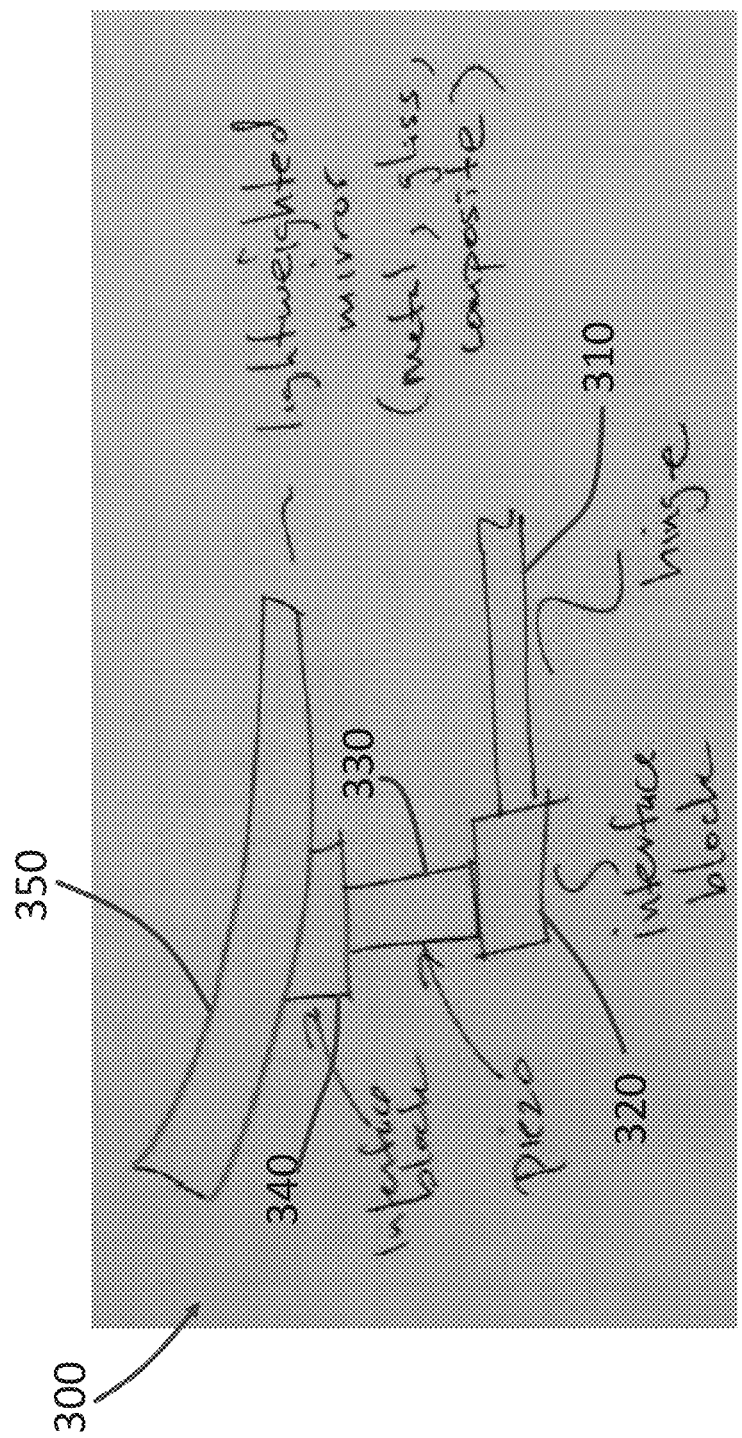
FIGS. 3A-3C show schematics of foldable members that can be used in imaging systems shown in FIG. 2.
Figure 3B:
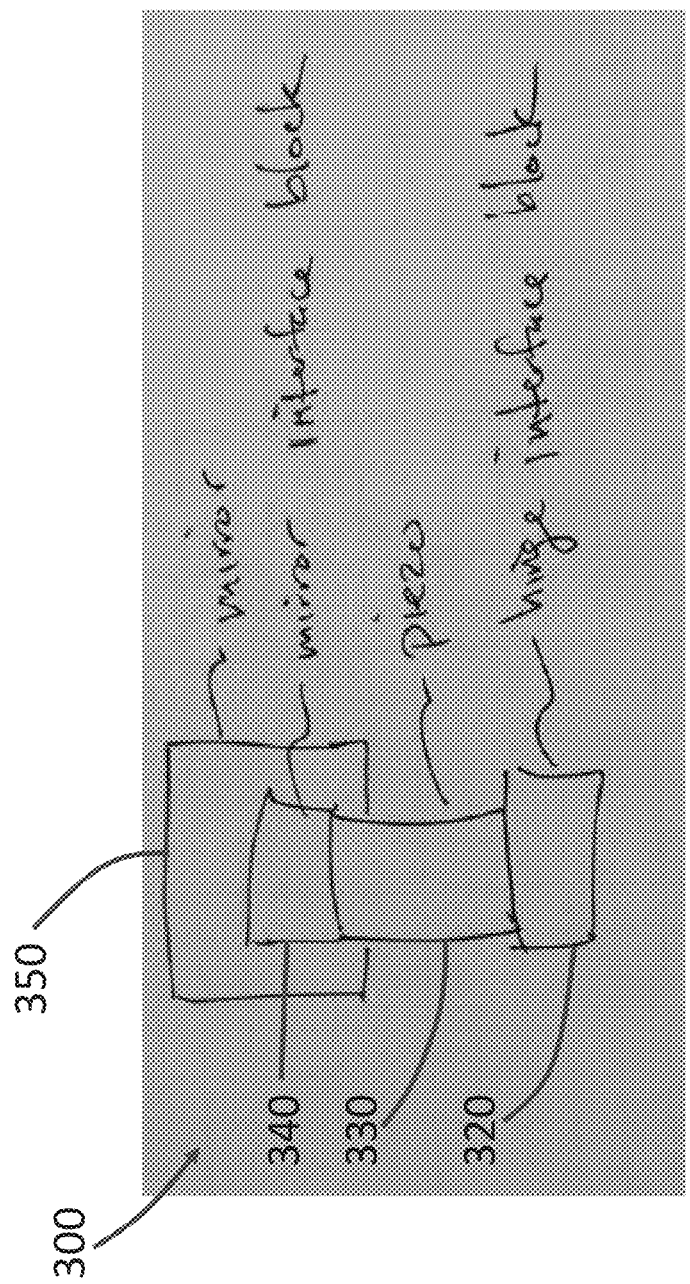
Figure 3C:
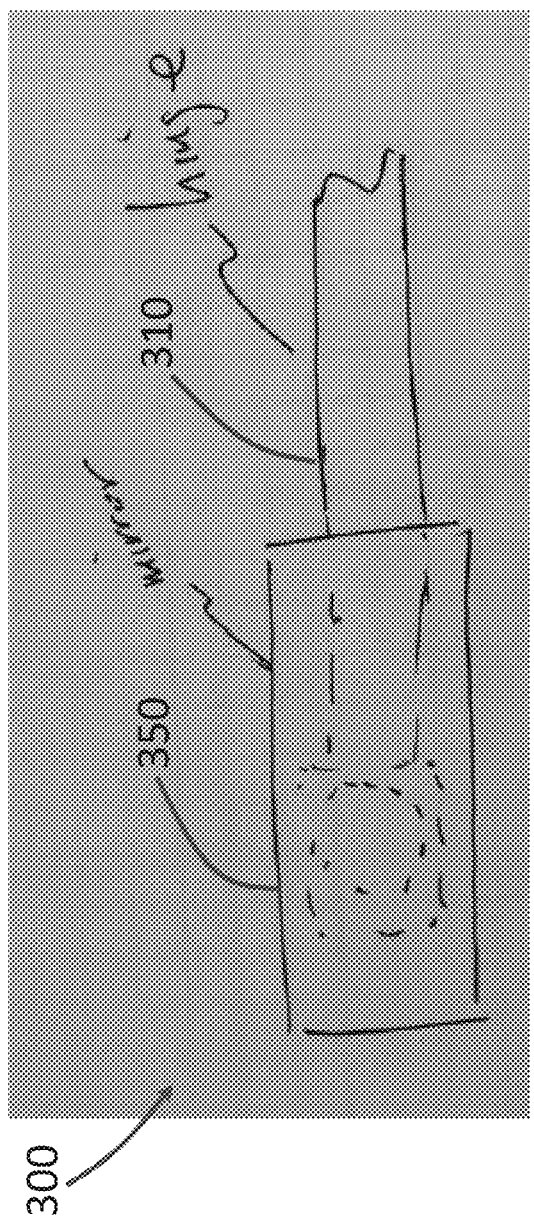

FIGS. 3A-3C show schematics of foldable members (e.g., like the foldable members 220 shown in FIG. 2) that can be used in imaging systems including sparse apertures. FIG. 3A shows a side view of a foldable member 300. The foldable member 300 includes an arm 310 (also referred to as a hinge or a petal), a piezoelectric actuator 330 coupled to the arm 310 via a hinge interface block 320, and a reflector 350 coupled to the piezoelectric actuator 330 via a reflector interface block 340. At least a portion of the arm 310 comprises a strain deployable composite so as to fold and unfold the foldable member 300. FIG. 3B and 3C show the back view and top view of the foldable member 300, respectively.

When reflectors 222 shown in FIG. 2 are deployed via the strain energy in the arms 224, the reflectors 222 may be slightly away from the desired position in the sparse aperture, thereby creating so called beam combining errors. The beam combining errors can include piston errors and tip/tilt errors.

Tip/tilt errors can be a result of rotations in the X and Y-axis, i.e., lateral directions substantially in the plane of the reflector surface. Tip/tilt errors can be further divided into relative tip/tilt errors and absolute tip/tilt errors. Relative tip/tilt errors generally mean the misalignment in the X/Y direction among the individual sub-apertures. In other words, different sub-apertures may be directed at different portions of a scene (looking at different places) when relative tip/tilt errors exist. In comparison, absolution tip/tilt errors generally mean that the collection of individual sub-apertures is directed at the same scene, but not the target scene. In other words, the resulting sparse aperture is looking at the wrong field of interest. In practice, tip/tilt errors can have an angular tolerance range of about 0.35 µrad.

Piston errors generally result from Optical Path Difference (OPD) among the sub-apertures in the Z-direction, i.e., substantially perpendicular to the surface of the reflectors. Stated differently, each individual sub-aperture in a sparse aperture may be directed at the same scene. In addition, each individual sub-aperture may also be directed at the target scene (i.e., the scene to be imaged). However, with piston errors, different individual sub-apertures are at distances from the scene. OPD misalignments between the sub-apertures can degrade the Point Spread Function (PSF) to that of the resulting sparse aperture. Generally, the tolerable piston error can be roughly $\frac{1}{10}\lambda$ of the operating wavelength of the sparse aperture.

The piezoelectric actuators 330 (also referred to as piezoelectric translators, piezoelectric transducers, piezo actuators, or simply actuators) can be precision ceramic actuators which convert electrical energy into linear motion with high speed, force, and fine resolution (e.g., less than one nanometer or sub-nanometer). In the foldable member 300, the piezoelectric actuator 330 is employed to control the tip, tilt, and piston location of each of the deployed reflector 350. In one example, the piezoelectric actuator 330 can dispose the reflector 350 to be within $\lambda/2$ of a desired position of the reflector within the sparse aperture. In another example, the piezoelectric actuator 330 can dispose the reflector 350 to be within $\lambda/10$ of a desired position of the reflector within the sparse aperture. In yet another example, the piezoelectric actuator 330 can dispose the reflector 350 to be within $\lambda/100$ of a desired position of the reflector within the sparse aperture (e.g., when infrared or longer wavelengths are used).

The movement range of the piezoelectric actuator 330 can depend on, for example, the initial estimates of the deployment accuracy and the jitter and thermal stability contributions from the spacecraft and environment. In one example, the piezoelectric actuator 330 can have a movement range of ±5 µm. In another example, the piezoelectric actuator 330 can have a movement range of ±10 µm. In yet another example, the piezoelectric actuator 330 can have a movement range of ±20 µm.

In some examples, the piezoelectric actuator 330 include a Physik Instrumente S325.3SL actuator. This actuator has a movement range greater than 25 µm in piston direction and a tip/tilt movement range greater than 5 mrad. The resolution in piston direction is about 0.5 nm and the tip/tilt resolution is about 0.05 µrad. In some examples, the size of the piezoelectric actuators 330 can be reduced by using 3 axis stages. An example can be the Nano-M3Z stage from Mad City Labs. This stage can fit within a 2.5 inch square by 0.8 inch thick cubesat and is available in a Invar configuration for thermal stability.

The hinge interface block 320 can be a mechanical member that connects the arm 310 with the piezoelectric actuator 220. The connection can be achieved via, for example, rivets, screws, bolts, or any other means known in the art. The reflector interface block 340 can be a mechanical element with the capability of 3-dimensional movement so as to align the reflector 350. In one example, the reflector interface block 340 include a mechanical mirror holder with one end receiving the reflector 350 and the other end mechanically coupled to the piezoelectric actuator 330. In another example, the reflector interface block 340 can include a kinematic mirror holder with a first piece receiving the reflector 350 and the second piece mechanically coupled to the piezoelectric actuator 330. The first piece and second piece are coupled via, for example, magnetic force. The first piece can be conveniently removed from and recoupled with the second piece without affecting the alignment of the reflector 350.

In one example, the reflector 350 is larger than the reflector interface block 340 (e.g., as shown in FIGS.

3A-3C). In another example, the reflector 350 can be substantially similar in size with the reflector interface block 340. In this case, the reflector 350, when deployed, may be more stable and less prone to misalignment due to, for example, mechanical vibration or thermal influence.

Arm Structures Comprising Strain Deployable Composite

FIGS. 4A-4B illustrate an arm assembly 400 (e.g., arms 224 shown in FIG. 2) that can be used in imaging systems shown in FIG. 2 or FIGS. 3A-3C. FIG. 4A shows a perspective view of an arm assembly 400 and FIG. 4B shows an exploded view of the arm assembly 400.

The arm assembly 400 shown in FIGS. 4A-4B includes an arm 410, a mirror end piece 420, and a metering end piece 430. The arm 410 further includes a first arm component 410a and a second arm component 410b (see FIG. 4B), each of which comprises a strain deployable composite as discussed in detail above. The mirror end piece 420 further includes a top mirror end piece 420a, a middle mirror end piece 420b, and a bottom mirror end piece 420c. Similarly, the metering end piece 430 further includes a top metering end piece 430a, a middle metering end piece 430b, and a bottom metering end piece 430c. When employed in the imaging system shown in FIG. 2, the mirror end piece 420 couples the reflectors to the arm assembly 400 and the metering end piece 430 couples the arm assembly 400 to the metering structure.

In one example, as shown in FIG. 4B, the first arm component 410a and the second arm component 410b have a tubular structure, e.g., the arm components 410a and 410b can be carved out, for example, from a tube made of the strain deployable material. When combined into an arm 410, the radial directions of the two tubular structures are toward each other such that the resulting arm 410 has a cavity defined by the two components 410a and 410b. This configuration can have good stability when the resulting arm 410 is bent and then released, therefore unfolding the reflectors coupled to the arm to a precise location as desired. In another example, the first arm components 410a and the second arm components 410b can have a planar structure (e.g., a plate) and they can be parallel to each other when combined to form the arm 410. In yet another example, each arm components 410a or 410b can have more than one tubular structures stacked together so as to further improve the stability of the resulting arm 410.

FIG. 4C shows a schematic of an open section configuration of an arm 411, in which a first arm component 411a and a second arm component 411b are stacked to form an open cavity (there are gaps between the two arm components 411a and 411b). FIG. 4D shows a schematic of a closed section configuration of an arm 412, in which a first arm component 412a and a second arm component 412b are stacked to form a closed cavity (no gap between the arm components 412a and 412b).

In one example, the cross section of the arm 410 has a cylindrical or substantially cylindrical shape (e.g., as shown in FIGS. 4C-4D). In another example, the cross section of the arm 410 has a circular or substantially circular shape. In yet another example, each arm component 410a and 410b can have a parabolic, hyperbolic, or elliptical shape and the resulting cross section of the arm 410 can be accordingly a combination of two half parabolic, hyperbolic, or elliptical shapes. In yet another example, the cross section of each arm component 410a and 410b can have a sinusoidal, waving, saw tooth, or any other shape that is applicable. The thickness of the arm can depend on the configuration (or layup) of the arm, the material in each component (410a/410b), and the processing steps to consolidate the tapes so as to achieve desired mechanical strength in view of possible constraints on the size and weight of the arm for launching. In one example, the thickness (i.e., thickness of the tape that constitutes the tubular structure) of each component 410a and 410b can be about 50 μm to about 1000 μm. In another example, the thickness of each component 410a and 410b can be about 200 μm to about 700 μm. In yet another example, the thickness of each component 410a and 410b can be about 300 μm to about 500 μm (e.g., 420 μm). In yet another example, the first component 410a and the second component 410b can have different thickness so as to achieve, for example, desired mechanical performance.

The mirror end piece 420 is used to couple reflectors to the arm assembly 400. In one example, the top mirror end piece 420a can include a piezoelectric actuator and a mirror holder so as to receive a reflector and adjust the position/orientation of the reflector. In another example, the top mirror end piece 420a can be coupled to a separate piezoelectric actuator and a separate mirror holder. In yet another example, the top mirror end piece 420a can be directly coupled to a reflector without the use of any piezoelectric actuators. The middle mirror end piece 420b can be configured to fit the shape of the cross section of the arm 410 so as to stably couple the first arm component 410a with the second arm component 410b. The bottom mirror end piece 420c can be a mechanical element that can securely couple to the top mirror end piece 420a and the middle mirror end piece 420b so as to avoid sliding of the arm components 410a and 410b.

The metering end piece 430 couples the arm assembly to a metering structure (e.g., the metering structure 210 shown in FIG. 2). When combined into an imaging system, the metering end piece 430 can be completely or substantially within the metering structure so as to, for example, reduce the form factor of the resulting imaging system. The top metering end piece 430a and the bottom metering end piece 430c can be configured to be compatible with connectors in the metering structure so as to facilitate the coupling. The coupling can be achieved by, for example, rivets, screws, bolts, gluing, magnetic force, or any other means known in the art. The middle metering end piece 430b can be configured to fit the shape of the cross section of the arm 410 so as to stably couple the first arm component 410a with the second arm component 410b.

Figure 5A:
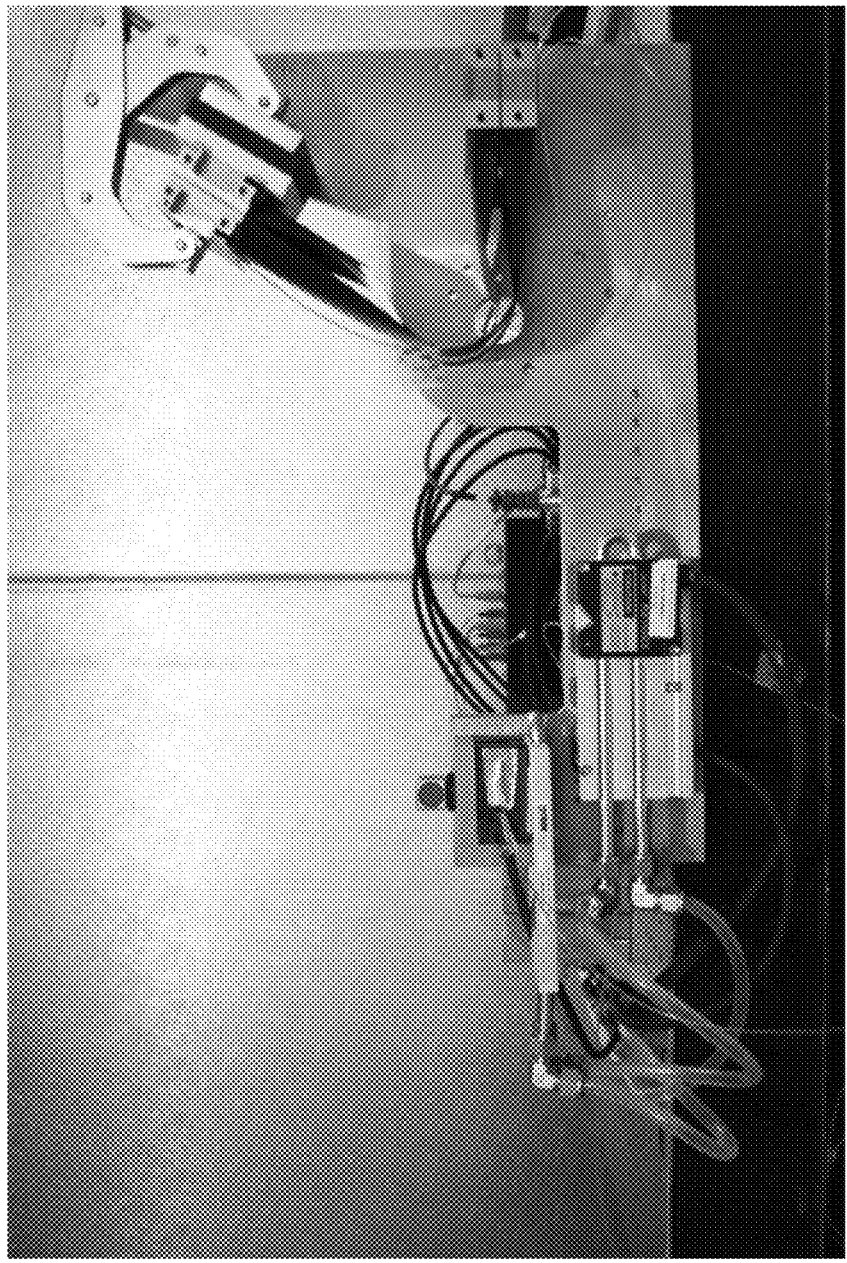
FIGS. 5A-5B show photos of an example arm in the stowed state and the deployed state, respectively. The arm is substantially like the ones shown in FIGS. 4A-4B.
Figure 5B:
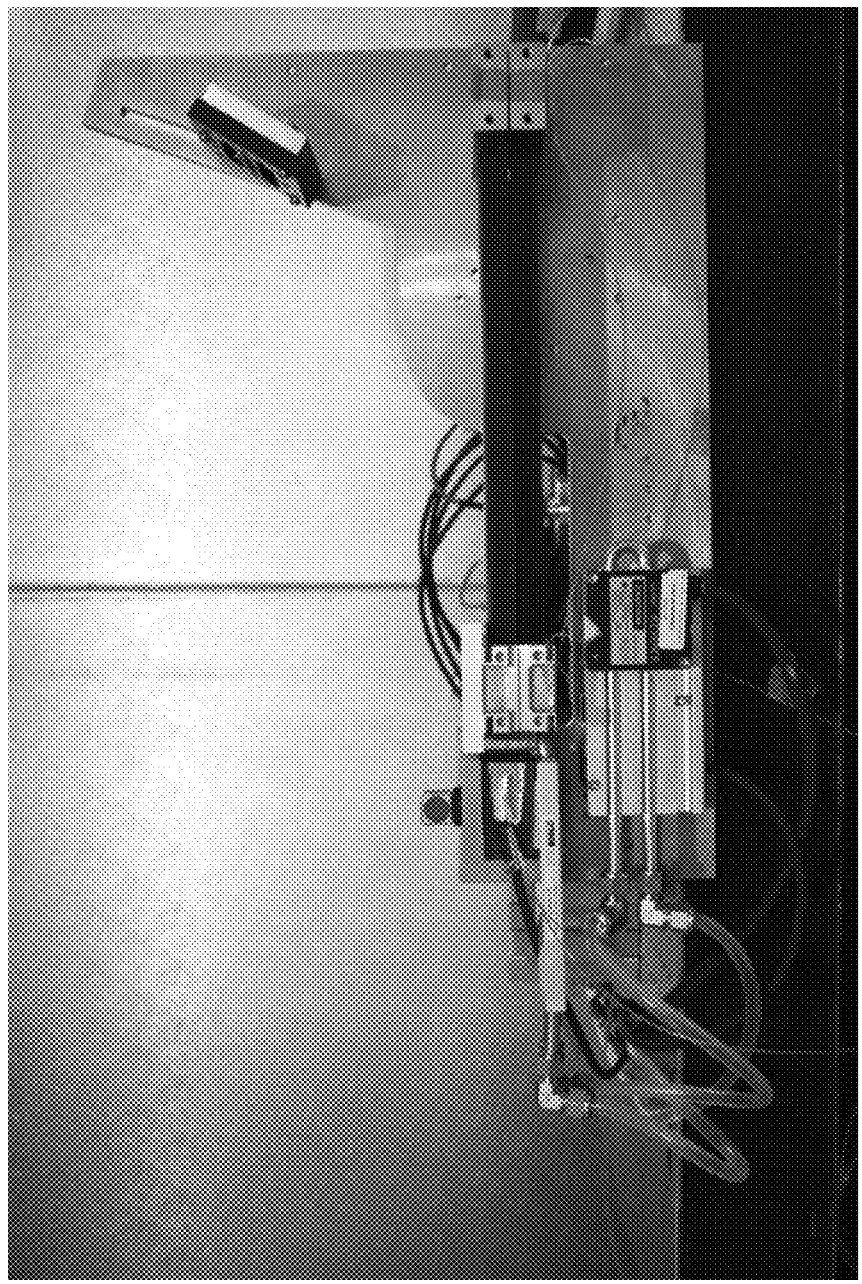

FIG. 5A is a photo of an arm assembly, substantially like the one shown in FIGS. 4A-4B, in a stowed state. The mirror end piece is fixed to a kinematic mount by a clamp. FIG. 5B is a photo of the arm assembly in a deployed state. In FIGS. 5A-5B, the arm is bent close to the middle point in the stowed state for illustrating purposes only. In practice, the arm can be bent at any other point on the arm when stowed for launching or for other purposes. For example, the arm can be bent close to the end connected to the metering structure.

Optical Designs of Sparse Aperture Telescopes

Figure 6B:
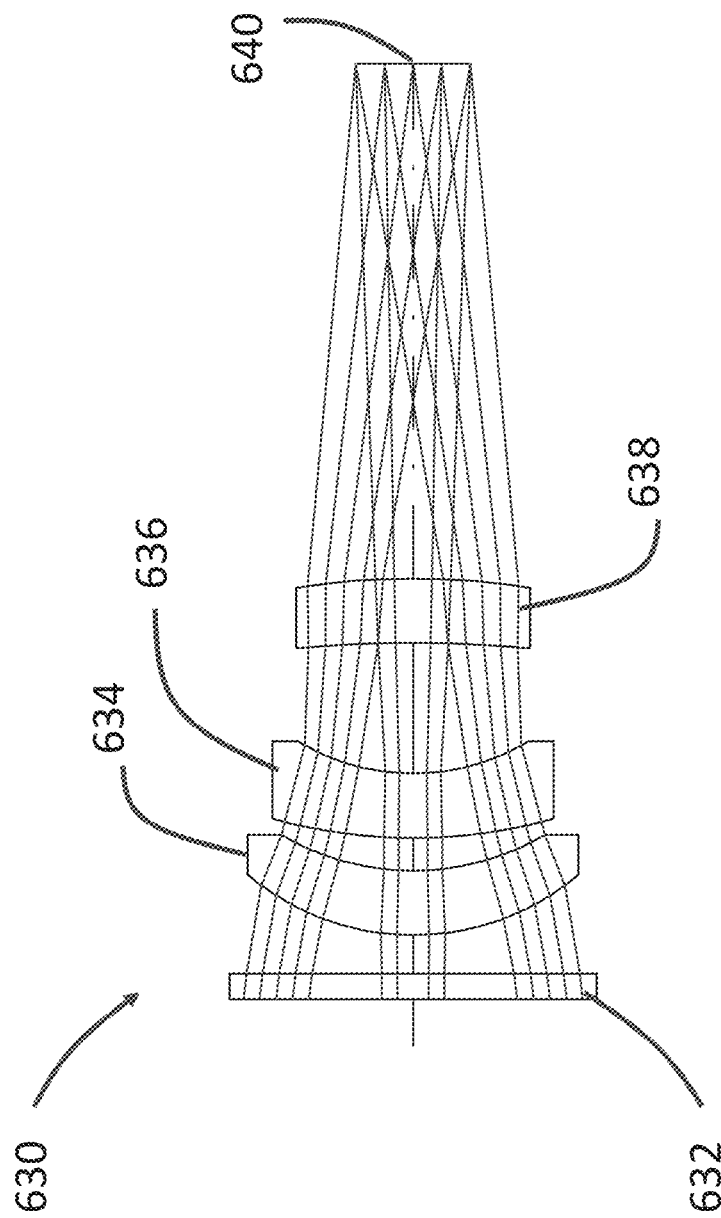

FIGS. 6A-6B show an exemplary optical design of sparse apertures that can be used in the imaging system shown in FIG. 2. The optical design shown in FIG. 6A includes a sparse aperture 610 which focuses incident beams 10, a secondary optic 620 to receive light beams reflected by the sparse aperture 610 and further reflects the light beams into an optical corrector group 630, which can perform aberration correction to the light beams before a detector 640 detect the light beams and form images. The sparse aperture 610 shown in FIG. 6A illustrates the virtual collecting surface of the sparse aperture 610. In practice, only a portion of the collecting surface may be filled with focusing optics (i.e., sub-apertures).

FIG. 6B shows a detailed schematic of the optical corrector group 630 shown in FIG. 6A. The optical corrector group 630 includes a flat optic 632, a first spherical convex optic 634, a concave optic 636, and a second convex optic 638. In one example, the flat optic 632 can be a filter to block lights at undesired wavelengths so as to reduce background noise. In another example, the flat optic 632 can include a widow coated with a filter film.

The three optics 634, 636, and 638 (collectively referred to as the corrector group) can perform three functions in operation before transmitting light beams to the detector 640. First, the light sensitive surface of the detector 640 is normally flat while the image surface produced by the telescope without the corrector is normally spherical. The corrector group can flatten the field of the telescope so the center and edges of the image are in focus. Second, the corrector group can improve the quality of the image at the edges by reducing the blurring at the edges. Third, the corrector group can reduce the prismatic separation of colors in the image.

Architectures of Deployable In-Space Coherent Imaging Telescopes

Using the concepts, components, and/or assemblies described above, various architectures of deployable in-space coherent imaging telescopes (DISCITs) can be constructed, with examples shown in FIGS. 7-10.

Figure 7:
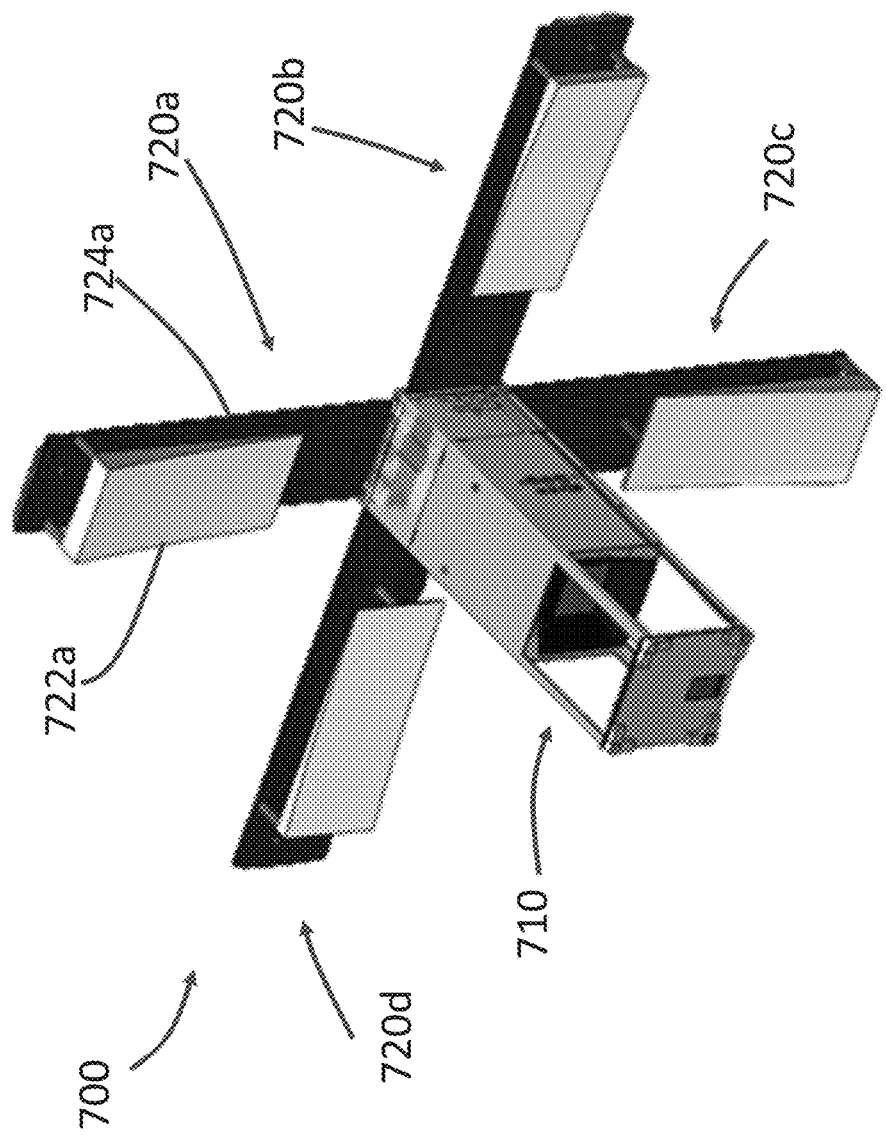
FIGS. 7-10 show architectures of in-space telescopes using sparse apertures.

FIG. 7 shows an architecture of a DISCIT 700 including a metering structure 710 and four foldable members 720a to 720d disposed around a periphery of the metering structure 710. Using the first foldable member 720a as an example, the foldable member 720a further comprises an arm 724a and a reflector 722a disposed on the arm 724a. The arm 724a comprises a strain deployable material described in detail above. The metering structure 710 in the DISCIT 700 has a square cross section and the each foldable member 720a to 720d is disposed on one side of the metering structure 710. The reflector 722a has a rectangular shape and occupies a substantial portion of the arm 724. The entire reflector 722a is substantially in contact with the arm 724a so as to improve the stability of the reflector 722a during either launching or normal operations. In this architecture, the diameter of the sparse aperture can be, for example, on the order of 1 meter.

Figure 8:
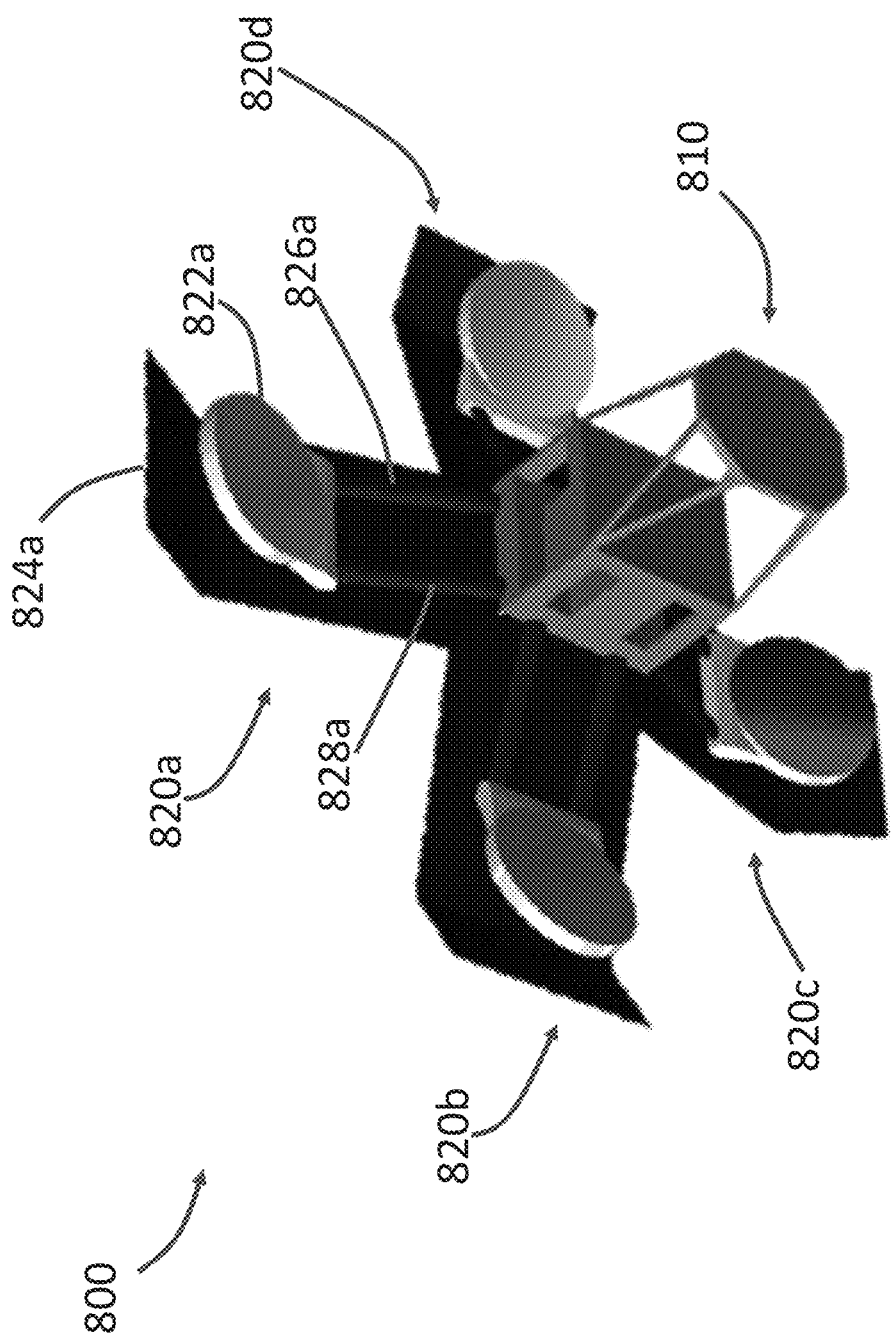

FIG. 8 shows an architecture of a DISCIT 800 including a metering structure 810 and four foldable members 820a to 820d disposed around a periphery of the metering structure 810. Using the first foldable member 820a as an example, the foldable member 820a includes an arm 824a made of a strain deployable composite and a reflector 822a disposed on the arm 824a. The foldable member 820a further includes a pair of supporting structures 826a and 828a directly connecting the bottom of the metering structure 810 to the reflector 822a. The pair of supporting structures 826a and 828a can further increase the stability of the reflector 822a. In addition, the pair of supporting structures 826a and 828a can be made of substantially stiff materials so as to help disposing the reflector 822a at the desired position during the unfolding of the DISCIT 800.

Compared to the DISCIT 700 shown in FIG. 7, the DISCIT 800 shown in FIG. 8 has a different form factor. More specifically, the length of the arm 824a is comparable to that of the metering structure. The arm 824a also has a slightly folded tip to protect the reflector 822a. The folded tip may also, in the stowed state, protect the metering structure 810 from, for example, mechanical shock. Diameters of the sparse aperture in this architecture can be on the order of, for example, 3 meters. The imaging system 800 shown in FIG. 8 can have a resolution on the order of that of the Hubble Space Telescope and have more space to increase precision pointing. The imaging system 800 can also fits within Evolved Expendable Launch Vehicle (EELV) Secondary Payload Adapter (ESPA) launch constraints.

Figure 9:
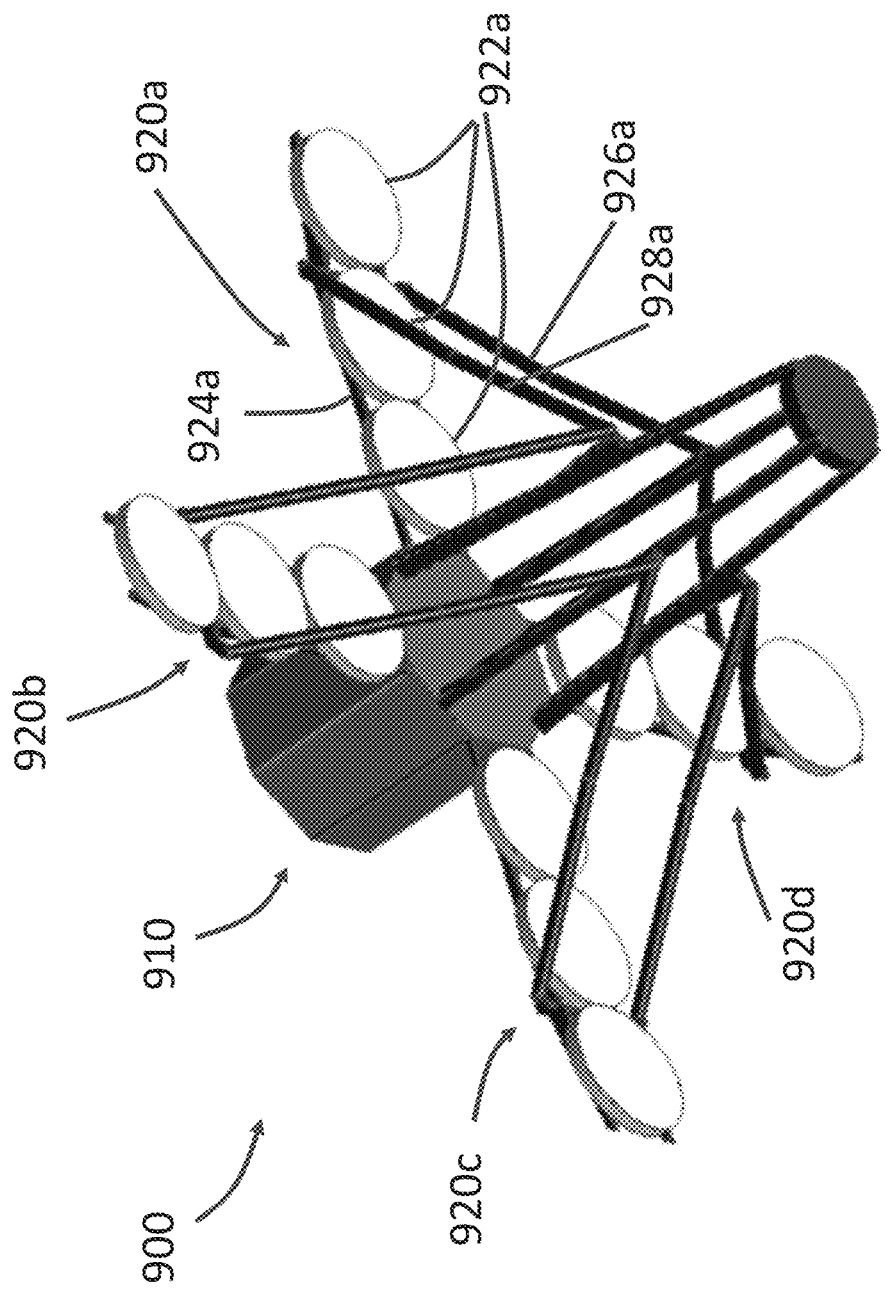

FIG. 9 shows an architecture of a DISCIT 900 including a metering structure 910 and four foldable members 920a to 920d disposed around a periphery of the metering structure 910. Using the first foldable member 920a as an example, the foldable member 920a includes three reflectors 922a disposed on an arm 922a. The foldable member 920a further includes a pair of supporting structure 926a and 928a (e.g., truss or similar structures) connecting the arm 924a to the middle of the metering structure 910. Diameters of the resulting sparse aperture in this architecture can be, for example, on the order of 7 meters.

FIG. 9 shows that each foldable member 920a includes three reflectors 922a for illustrating purposes only. In practice, the number of reflectors 922a disposed on each arm 924a can be less than three or greater than three, depending, for example, on the strain energy that can be stored in the arm 922a, the desired fill factor of the resulting sparse aperture, or the desired weight of the total telescope.

In some examples, one or more of the reflectors 922a can be replaced by other devices. For example, the foldable member 920a may include two reflectors and one solar battery on the arm 924a. In another example, the foldable member 920a may include one reflector, one solar battery, and one antenna on the arm 924a.

In one example, the pair of supporting structures 926a and 928a comprises a stiff material so as to support the foldable members 920a in the deployed state. In this case, the supporting structures 926a and 928a may be configured to slide along the length of the metering structure 910 so as to facilitate folding and unfolding of the foldable member 920a. In another example, the pair of supporting structures 926a and 928a also comprises a strain deployable composite. In this case, the supporting structures 926a and 928a can be bent during stowing and unfolded during deployment. Using both the arm 924a and supporting structures 926a and 928a to unfold the reflector 922a may increase the precision of the positioning.

The imaging system 900 shown in FIG. 9 can further improve the resolution to exceed that of the James Webber Space Telescope (JWST). The entire system 900 may be more complex compared to the imaging systems 700 and 800, but with the benefit of better MTF performance due to, for example, increased collecting area (also referred to as fill) that extends to the metering structure 910.

Figure 10:
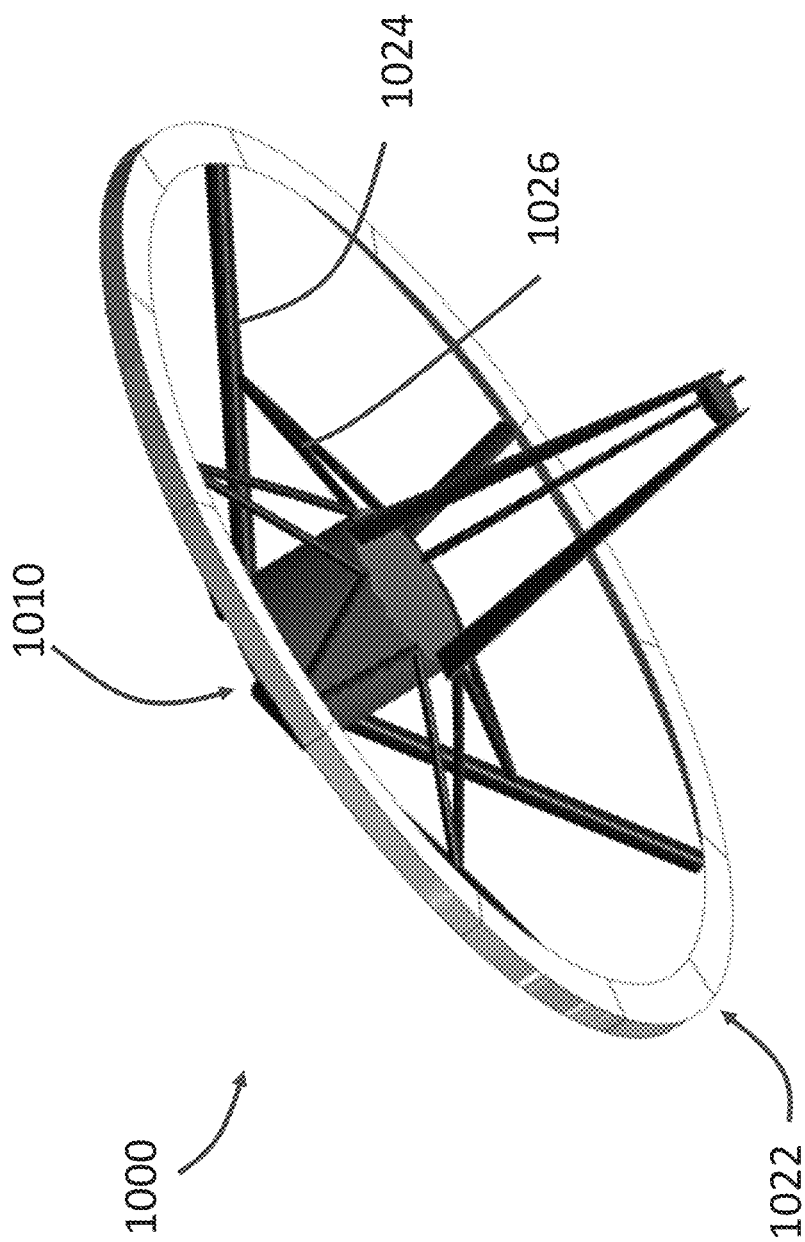

FIG. 10 shows an "umbrella" architecture of a DISCIT, in which the diameter of the sparse aperture can be, for example, on the order of 20 meters and the resulting resolution can exceed that of any previous telescopes. The DISCIT 1000 includes a metering structure 1010 and a plurality of reflectors 1022, which are disposed substantially around the metering structure 1010 and form a circle. The reflectors 1022 are coupled to the metering structure 1010 via a plurality of primary supporting structures 1024 connecting the top of the metering structure 1010 to the reflectors 1022 and a plurality of secondary supporting structures 1026 connecting the bottom of the metering structure 1010 to the middle of the primary supporting structures 1024. In operation, the DISCIT 1000 can be folded (e.g., during launching) and unfolded (during deployment) like an umbrella.

In one example, the primary supporting structures 1024 comprise a strain deployable composite and the secondary supporting structures 1026 comprise a rigid material. In this example, the secondary supporting structures 1026 may slide along the length of the primary supporting structure 1024 so as to facilitate folding and unfolding of the DISCIT 1000. In another example, both the primary supporting structures 1024 and the secondary supporting structures 1026 comprise a strain deployable composite. In this case, both the primary supporting structures 1024 and the secondary supporting structures 1026 can be bent in the stowed state.

Methods of Aligning Deployable In-Space Coherent Imaging Telescopes

In one example, methods of aligning DISCIT can be achieved by using on-board metrology, man-made guide stars (e.g., point light sources), or natural guide stars. In another example, methods of aligning DISCIT systems can be substantially imagery-based. Stated differently, alignment of sub-apertures in a DISCIT system can uses only imagery generated by the DISCIT system. The method can include a feedback system that can align reflectors on each foldable member by adaptively optimizing the quality of images collected on arbitrary scenes (either man-made or natural arbitrary scenes). This method can eliminate complex wavefront sensors and the need of guide stars or metrology subsystems in conventional sparse aperture imaging systems, thereby significantly reducing the complexity of the imaging systems.

Figure 11:
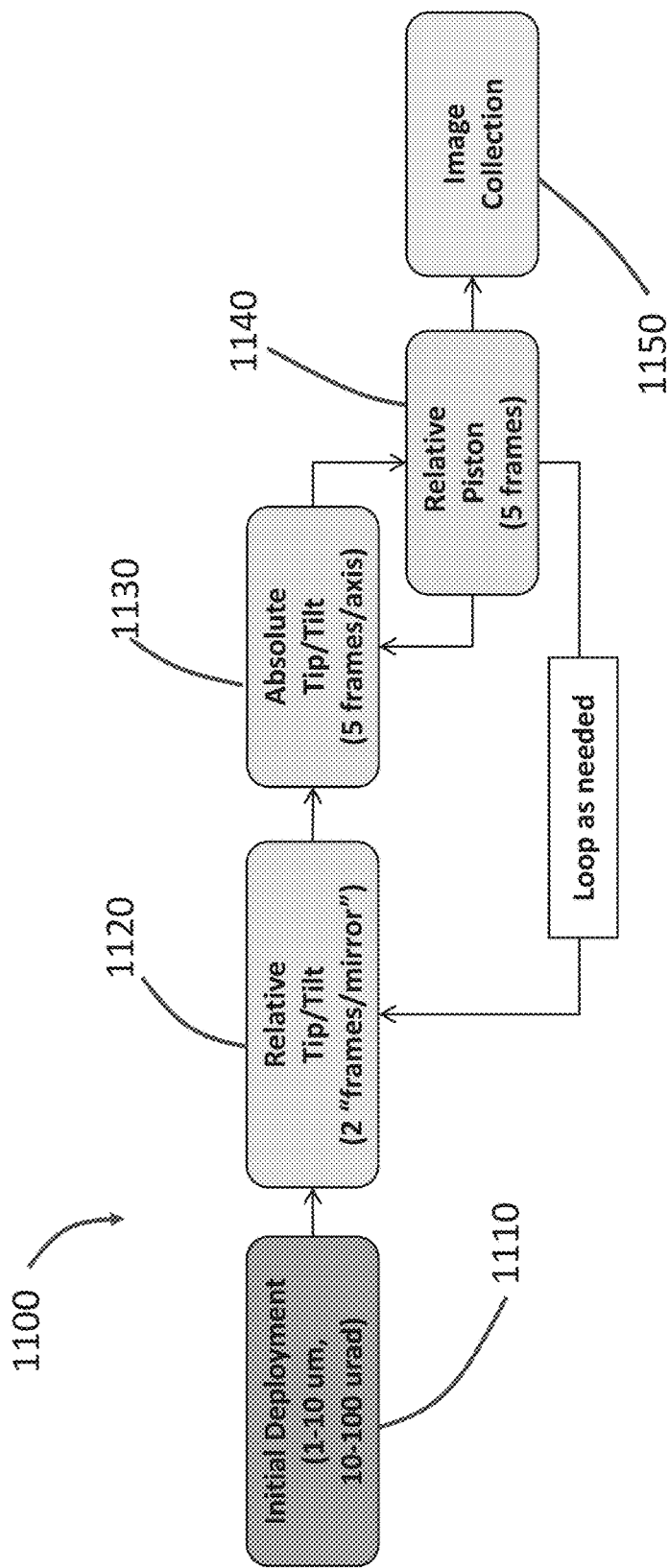
FIG. 11 illustrates a method of aligning deployable in-space coherent imaging systems of various apertures.

FIG. 11 shows a flowchart of a method to align a DISCIT. The method 1100 starts from step 1110 in which the DISCIT system is initially deployed. The initial deployment can be achieved by, for example, unfolding arms comprising a strain deployable material as shown in FIG. 2 or FIGS. 7-10. After the initial deployment of the system, reflectors that constitute the sparse aperture may be displaced from the desired position by an offset. The linear offset may be in the range of about 1 µm to about 10 µm and the angular offset may be in the range of about 10 µrad to about 100 µrad.

As introduced above, the initial offset may include tip/tilt errors and piston errors. The tip/tilt errors can further include relative tip/tilt errors and absolute tip/tilt errors. After the initial deployment 1110, the method 1100 proceeds into step 1120, in which the relative tip/tilt errors are corrected, i.e., correcting the misalignment in the lateral direction among the individual sub-apertures so as to direct the sub-apertures at the same scene.

At step 1120, relative tip/tilt errors (also referred to as relative pointing errors) among sub-apertures can be nulled by generating "shear" images. More specifically, pairs of frames can be acquired where a single reflector is tilted by a small, known amount between frames using, for example, a piezoelectric actuator. The shear image (essentially a gradient) can be the difference between these two frames. The shear image can then be processed to reduce noise and cross-correlated with other shear images to eliminate the relative pointing errors between sub-apertures. Basically, what the cross-correlation provides can be the ability to point all mirrors in the same direction. The shear image can help localize the pointing of each mirror and then compare these images. The cross-correlation can provide a pairwise displacement map that indicates how to align the pointing of the mirrors. This step 1120 can be used for real-time control of piezoelectric actuators and alignment of images from point sources.

Upon the correction of relative pointing errors at step 1120, the method 1100 proceeds to step 1130, where the absolute tip/tilt errors (also referred to as absolute pointing errors) are corrected, i.e., steering the each individual sub-aperture as well as the sparse aperture at the target scene.

Figure 12:
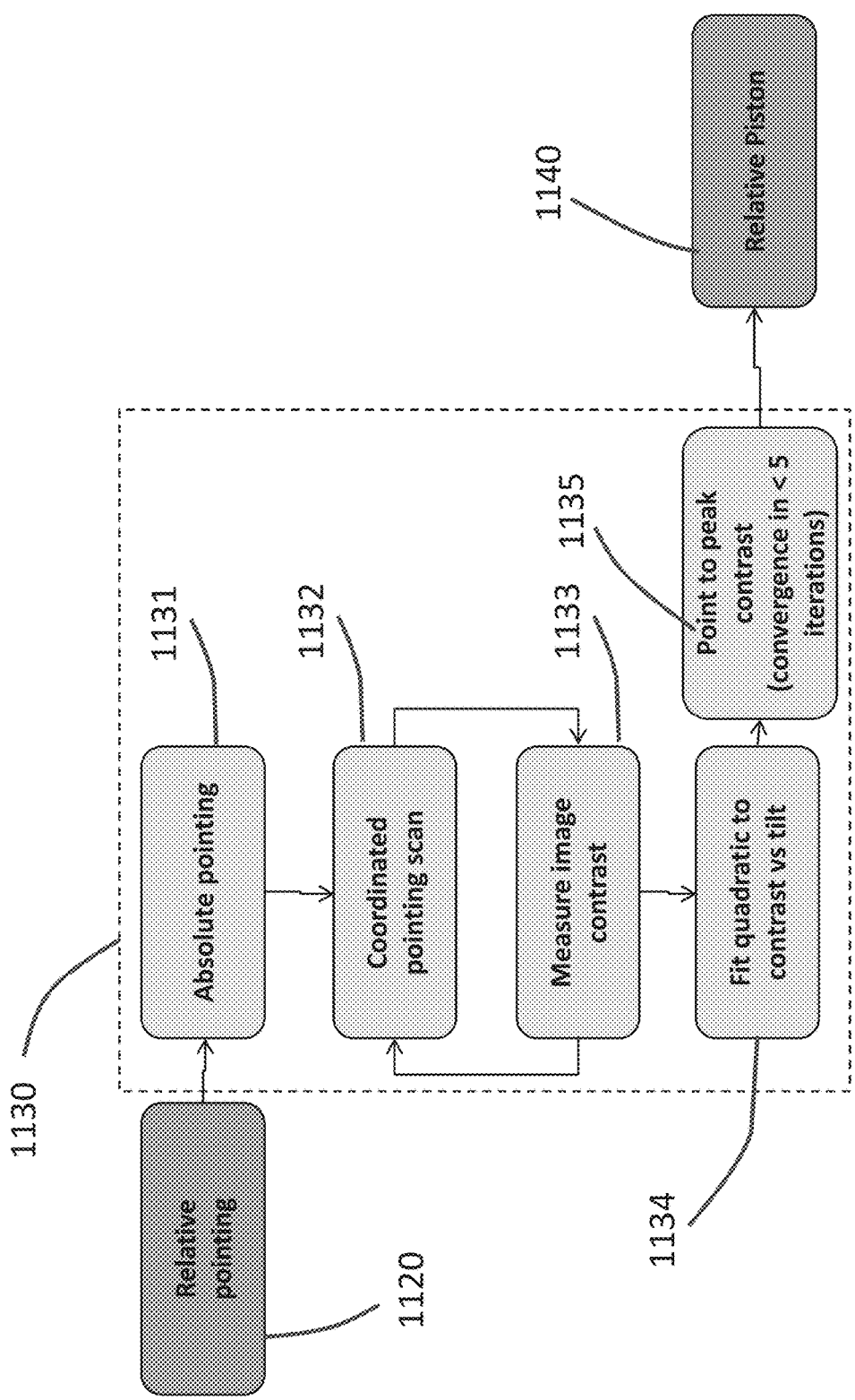
FIG. 12 illustrates a method of correcting absolute pointing errors in deployable in-space coherent imaging systems of various apertures.

FIG. 12 shows a flow chart illustrating specific steps for correcting absolute point errors. In general, absolute pointing errors can be minimized using a directed search scheme. More specifically, an image quality metric (e.g., the square of normalized pixel intensity summed over the scene) can be defined. This image quality metric can then be maximized as a function of telescope (i.e., the entire sparse aperture) pointing and mirror petal piston. The telescope pointing and mirror petal piston form a six-dimensional parameter space with many local maxima.

As shown in FIG. 12, the method 1130 starts by pointing the entire sparse aperture at an initial position at step 1131. The method 1130 then measures image quality with respect to overall pointing by repetitive coordinated pointing scan at step 1132 and image frame generation and contrast measurement at step 1133. The coordinated pointing scan can be performed by rotating mirrors about one axis at a time while introducing corresponding piston displacements (on petals orthogonal to the rotation axis). The piston displacements essentially steer the entire array of sub-apertures. The entire system can be rotated about the center of the system by displacing in angle and in piston, instead of swinging a monolithic mirror.

At step 1134, the image quality as a function of the overall pointing can be curve fit with a quadratic model to estimate a pointing condition (e.g., the pointing that maximizes the quadratic fit to the image sharpness). The quadratic fit is required to smooth out spurious variations in measured sharpness caused by local features in the image itself). This step 1134 may leave a piston error (can be corrected in subsequent steps). Repetitive step displacements can then be performed to the two mirrors orthogonal to the rotation axis in a bisection search scheme. These displacements can be roughly the desired wavefront precision of the instrument (<0.2 µm for visible light). This approach 1130 can align mirrors along a given axis to better than λ/4 after a handful of iterations (e.g., 4-6 iterations).

Figure 13:
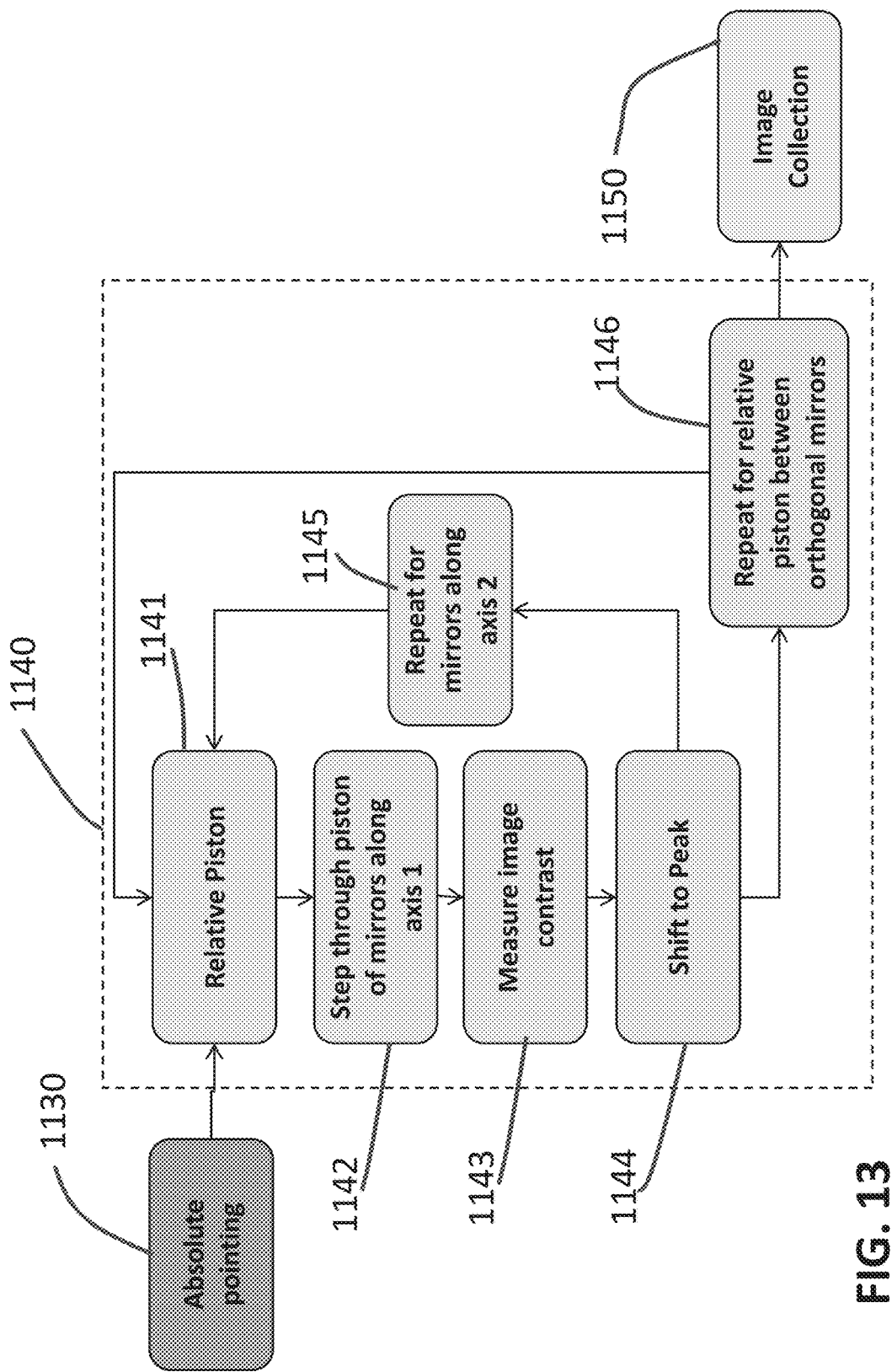
FIG. 13 illustrates a method of correcting piston errors in deployable in-space coherent imaging systems of various apertures.

Upon the correction of absolute point errors at step 1130, the method 1100 then corrects possible position errors at step 1140, i.e., correcting the optical path differences among the sub-apertures. FIG. 13 shows specific steps in a method of correcting the piston errors. The method 1140 starts from an initial relative piston at step 1141, followed by moving a first sub-aperture (e.g., mirror) along a first axis to a new piston position at step 1142 and measuring the contrast of the image acquired at this new piston position at step 1143. In response to the measured contrast of the acquired image, moving the mirror to the peak contrast position is performed at step 1144. Steps 1141 through 1144 can then be carried out at step 1145 on the second axis so as to complete the correction of piston error on this mirror. Then steps 1141 through 1145 can be performed at step 1146 between orthogonal mirrors (mirrors that are orthogonal in a Cartesian coordinate system, e.g., using the center of the imaging system as the origin) so as to align the entire telescope.

After all the offset (relative tip/tilt errors, absolute tip/tilt errors, and piston errors) is corrected, the method 1100 can then go to step 1140, where the system can perform image collections.

As shown in FIG. 11, there can be some feedback loops in the method 1100. In one example, after correcting piston errors at step 1140, if relative tip/tilt errors (e.g., due to the alignment at step 1140) are observed, the method 1100 can go back to step 1120 to correct the tip/tilt errors. In another example, if absolute tip/tilt errors are observed after step 1140, the method 1100 can just go back to step 1130 to correct the absolute tip/tilt errors.

In one example, the method 1100 can be performed by processors included in the DISCIT system (e.g., in the metering structure 210 shown in FIG. 2). In another example, the method 1100 can be performed by ground-based processors.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An imaging system comprising:
a metering structure; and
a plurality of foldable members disposed around a periphery of the metering structure, each foldable member in the plurality of foldable members comprising:
an arm comprising a strain deployable composite; and
a reflector disposed on the arm,
wherein the arm in a respective foldable member in the plurality of foldable members is configured to hold the respective foldable member toward the metering structure in a first state and to hold the respective foldable member away from the metering structure in a second state such that the reflector of the respective foldable member forms part of a sparse aperture in the second state,
wherein the arm is attached directly to the metering structure, and
wherein the arm has a first end and a second end and is bent at a point between the first end and the second end in the first state and unbends when transitioning from the first state to the second state.

2. The imaging system of claim 1, wherein each foldable member further comprises an actuator, operably coupled to the reflector, to align the reflector.

3. The imaging system of claim 2, wherein the actuator is configured to align the reflector in three dimensions.

4. The imaging system of claim 1, wherein the strain deployable composite comprises at least one of fiberglass or a carbon fiber composite.

5. The imaging system of claim 1, wherein the strain deployable composite is strained in the first state and unstrained in the second state.

6. The imaging system of claim 1, wherein the arm in each foldable member comprises:
a first composite tape comprising the strain deployable composite;
a second composite tape comprising the strain deployable composite; and
a separator disposed between the first composite tape and the second composite tape such that the first composite tape and the second composite tape define at least a portion of a cavity.

7. The imaging system of claim 6, wherein at least one of the first composite tape and the second composite tape defines at least a portion of a tubular structure.

8. The imaging system of claim 1, further comprising:
a detector; and
a secondary optic, in optical communication with the detector and the sparse aperture, to direct light reflected by the sparse aperture toward the detector.

9. The imaging system of claim 8, wherein the secondary optic has a hyperbolic surface with high-order aspherics.

10. The imaging system of claim 1, wherein the plurality of foldable members comprises at least four foldable members disposed around the periphery of the metering structure.

11. The imaging system of claim 1, wherein, in the second state, each reflector is within one micron of a desired position of the reflector within the sparse aperture.

12. The imaging system of claim 1, wherein, in the second state, each reflector is within about $\lambda/10$ to about $\lambda/2$ of a desired position of the reflector within the sparse aperture, wherein $\lambda$ is an operating wavelength of the imaging system.

13. The imaging system of claim 1, wherein the sparse aperture defines a portion of a hyperboloid, a paraboloid, or a sphere.

14. The imaging system of claim 1, wherein each reflector comprises a plurality of reflecting elements.

15. A method of deploying an imaging system, the imaging system comprising a plurality of foldable members disposed around a periphery of a metering structure, each foldable member in the plurality of foldable members attached directly to the metering structure and comprising a reflector disposed on an arm comprising a strain deployable composite, each arm having a first end and a second end, the method comprising:
A) stowing the plurality of foldable members so as to strain the strain deployable composite in each arm, the stowing comprising bending each arm at a point between the first end and the second end of the arm; and
B) releasing the strain on the strain deployable composite so as to deploy reflectors in the plurality of foldable members to form a sparse aperture, the releasing comprising allowing each arm to unbend.

16. The method of claim 15, wherein A) comprises collapsing the plurality of foldable members towards the metering structure.

17. The method of claim 15, wherein B) further comprises deploying the reflectors to form a sparse aperture.

18. The method of claim 15, further comprising:
C) aligning at least one reflector in the plurality of foldable members with an actuator operably coupled to the at least one reflector.

19. The method of claim 18, wherein C) comprises:
C1) sensing light reflected by the sparse aperture;
C2) determining a difference between an actual position of the at least one reflector and a desired position of the at least one reflector based at least in part on the sensing of the light in C1); and
C3) actuating the actuator so as to move the at least one reflector towards the desired position.

20. The method of claim 19, wherein C1) comprises:
reflecting a portion of the light from the at least one reflector toward a secondary optic;
reflecting the portion of the light from the secondary optic to a detector so as to form at least a portion of an image; and
sensing the at least a portion of the image with a detector.

21. The method of claim 19, wherein C3) comprises:
moving the at least one reflector to within $\lambda/2$ of the desired position, wherein $\lambda$ is a wavelength of the light detected in C1).

22. An imaging system comprising:
a metering structure; and
a plurality of foldable members disposed around a periphery of the metering structure, each foldable member in the plurality of foldable members comprising a respective arm and a respective reflector disposed on the respective arm, wherein the respective arm comprises:
a first composite tape; and
a second composite tape disposed on the first composite tape so as to define at least partially a cavity between the first composite tape and the second composite tape,
wherein the first composite tape and the second composite tape comprise a fiberglass or a carbon fiber composite, and
wherein the arm in a respective foldable member in the plurality of foldable members is configured to hold the respective foldable member toward the metering structure in a first state and to hold the respective foldable member away from the metering structure in a second state such that the reflector of the respective foldable member forms part of a sparse aperture in the second state.

23. The imaging system of claim 1, wherein the arm is bent close to the first end in the first state.

24. The imaging system of claim 1, wherein the point is close to a midpoint between the first end and the second end in the first state.

25. The imaging system of claim 1, wherein the arm stores strain energy in the first state and is deployed from the first state to the second state by releasing the strain energy.

* * * * *